(12) United States Patent
Urdaneta et al.

(10) Patent No.: US 7,117,104 B2
(45) Date of Patent: Oct. 3, 2006

(54) ULTRASONIC LIQUID FLOW CONTROLLER

(75) Inventors: Nelson Urdaneta, Costa Mesa, CA (US); Aaron S Tint, Rowland Heights, CA (US); Hao Duan, Huntington Beach, CA (US); Eric J Redemann, Corona Del Mar, CA (US); Christopher Andrew Wacinski, Los Gatos, CA (US)

(73) Assignee: Celerity, Inc., Austin, TX (US)

( * ) Notice: Subject to any disclaimer, the term of this patent is extended or adjusted under 35 U.S.C. 154(b) by 2 days.

(21) Appl. No.: 10/878,974

(22) Filed: Jun. 28, 2004

(65) Prior Publication Data

US 2005/0288873 A1  Dec. 29, 2005

(51) Int. Cl.
*G01F 1/00* (2006.01)
*G01F 7/00* (2006.01)
*G01F 19/00* (2006.01)

(52) U.S. Cl. .......................................... 702/48; 702/50
(58) Field of Classification Search .................. 702/42
See application file for complete search history.

(56) References Cited

U.S. PATENT DOCUMENTS

| | | | |
|---|---|---|---|
| 3,357,243 A | 12/1967 | Woodcock | |
| 3,575,050 A | 4/1971 | Lynnworth | |
| 3,851,526 A | 12/1974 | Drexel | |
| 3,987,674 A | 10/1976 | Baumoel | |
| 4,003,252 A | 1/1977 | Dewath | |
| 4,164,865 A | 8/1979 | Hall et al. | |
| 4,286,470 A | 9/1981 | Lynnworth | |
| 4,787,252 A | 11/1988 | Jacobson et al. | |
| 4,996,871 A * | 3/1991 | Romano | 73/32 A |
| 5,001,936 A | 3/1991 | Baumoel | |
| 5,131,278 A | 7/1992 | Baumoel | |
| 5,594,181 A | 1/1997 | Stange | |

(Continued)

FOREIGN PATENT DOCUMENTS

EP  0 312 224  4/1989

(Continued)

OTHER PUBLICATIONS

Hiroaki Ishikawa, Masaki Takamoto, Kazuyoshi Suimizu, Hideaki Monji, Goichi Matsui, Sensor Configuration and Flow Rate Characteristics of Ultrasonic Flowmeter for Very Low Liquids Flow Rate, Transactions of the Society of Instrument and Control Engineers, vol. 36, No. 12, pp. 1071-1078 (2000).

(Continued)

*Primary Examiner*—John Barlow
*Assistant Examiner*—Sujoy Kundu
(74) *Attorney, Agent, or Firm*—Lowrie, Lando & Anastasi, LLP

(57) ABSTRACT

An ultrasonic flow meter includes a conduit, a first ultrasonic transducer, a second ultrasonic transducer, and a controller. The first ultrasonic transducer is disposed at a first position about a first portion of the conduit to transmit a first ultrasonic signal and to receive a second ultrasonic signal. The second ultrasonic transducer is disposed at a second position about a second portion of the conduit that is spaced apart from the first position along a length of the conduit to transmit the second ultrasonic signal and to receive the first ultrasonic signal. The controller is configured to cross-correlate the first and second received ultrasonic signals and generate a resulting time-domain signal, analyze the resulting time-domain signal to determine a difference in transit time between the first and second received ultrasonic signals, and calculate a rate of flow of a fluid in the conduit based upon the determined difference.

30 Claims, 11 Drawing Sheets

U.S. PATENT DOCUMENTS

| | | | |
|---|---|---|---|
| 5,669,408 | A | 9/1997 | Nishino et al. |
| 5,672,832 | A | 9/1997 | Cucci et al. |
| 5,717,145 | A | 2/1998 | Yasuhara et al. |
| 5,791,369 | A | 8/1998 | Nishino et al. |
| 5,792,965 | A | 8/1998 | Bignell |
| 5,816,285 | A | 10/1998 | Ohmi et al. |
| 5,818,735 | A | 10/1998 | Tigwell et al. |
| 5,861,546 | A | 1/1999 | Sagi et al. |
| 5,868,159 | A | 2/1999 | Loan et al. |
| 5,911,238 | A | 6/1999 | Bump et al. |
| 5,974,897 | A | 11/1999 | Koyano et al. |
| 6,055,868 | A | 5/2000 | Koyano et al. |
| 6,152,162 | A | 11/2000 | Balazy et al. |
| 6,152,168 | A | 11/2000 | Ohmi et al. |
| 6,305,233 | B1 | 10/2001 | Braathen et al. |
| 6,431,950 | B1 | 8/2002 | Mayes |
| 6,578,435 | B1 | 6/2003 | Gould et al. |
| 6,612,175 | B1 | 9/2003 | Peterson et al. |
| 6,622,572 | B1 | 9/2003 | Kobayashi et al. |
| 6,647,805 | B1 | 11/2003 | Kobayashi et al. |
| 6,684,112 | B1 | 1/2004 | Cheng |
| 6,685,668 | B1 | 2/2004 | Cho et al. |
| 6,758,102 | B1 | 7/2004 | Henry et al. |
| 6,782,326 | B1 | 8/2004 | Takamoto et al. |
| 6,877,387 | B1 | 4/2005 | Certon et al. |
| 2001/0010031 | A1 | 7/2001 | Takamoto et al. |
| 2003/0097882 | A1 | 5/2003 | Schlosser et al. |
| 2003/0115969 | A1 | 6/2003 | Koyano et al. |
| 2003/0189060 | A1 | 10/2003 | Osterheld et al. |
| 2003/0209083 | A1 | 11/2003 | Nakabayashi et al. |
| 2004/0030509 | A1 | 2/2004 | Plong-Soerensen et al. |
| 2004/0050176 | A1 | 3/2004 | Ohnishi |
| 2004/0199340 | A1* | 10/2004 | Kersey et al. ............... 702/50 |

FOREIGN PATENT DOCUMENTS

| | | |
|---|---|---|
| EP | 1 113 247 | 7/2001 |
| WO | WO 00/03205 | 1/2000 |
| WO | WO 2004/010086 A2 | 1/2004 |
| WO | WO 2004/010474 A2 | 1/2004 |

OTHER PUBLICATIONS

Ron Chiarello, Eric Boyd, Chris Wacinski, Chris Schutte, Jerry Elkind, Nelson Urdaneta, Roxanne Holtz and Joseph Foster, Point-of-Use Liquid Chemical Sensors for Process Tools, Semi® Technical Symposium: Innovations in Semiconductor Manufacturing (STS:ISM), Presented Jul. 13, 2004.

Volker, Hans and Volker, Skwarek, "Model About The Working-Principle Of The Ultrasonic Cross Correlation Flowmeter".

Grennberg, Anders and Sandell, Magnus, "Estimation of Subsample Time Delay Differences in Narrowband Ultrasonic Echoes Using the Hilbert Transform Correlation," Transactions on Ultrasonics, Ferroelectrics and Frequency Control, vol. 41, No. 5, pp. 588-595, Sep. 1994.

Langton, Charan, "Signal Processing & Stimulation Newsletter," URL:http://www.complextoreal.com/tcomplex.htm, 17 pages, [Mar. 16, 2004 6:56:21 AM], Copyright 1999 Charan Langton.

Fukuhara, Satoshi, Kataoka Akira, Ukezono Nobuhiro, Sekiguch, Toshio, US350 Ultrasonic Flowmeter, vol. 48, No. 1, pp. 29-32, (2004).

Kirkwood, Brent C., Acoustic Source Localization Using Time-Delay Estimation, Aug. 4, 2003, Technical University of Denmark (DTV) Thesis for M.Sc. Engineering Acoustics Program.

Hiroaki Ishikawa, Masaki Takamoto, Kazuyoshi Suimizu, Hideaki Monji, Goichi Matsui, Sensor Configuration and Flow Rate Characteristics of Ultrasonic Flowmeter for Very Low Liquids Flow Rate, vol. 36, No. 12, pp. 1071-1078 (2000).

Ron Chiarello, Eric Boyd, Chris Wachinski, Chris Schutte, Jerry Elkind, Nelson Urdaneta, Roxanne Holtz and Joseph Foster, Point-of-Use Liquid Chemical Sensors for Process Tools, Semi® Technical Symposium: Innovations in Semiconductor Manufacturing (STS: ISM).

Pan et al., "Experimental and numerical investigations of axisymmetric wave propagation in cylindrical pipe filled with fluid," J. Acoust. Soc. Am. 113(6), pp. 3209-3214, Jun. 2003.

"Measurement of fluid flow in closed conduits—Methods using transit-time ultrasonic flowmeters," Technical Report, ISO/TR 127651998(E).

* cited by examiner

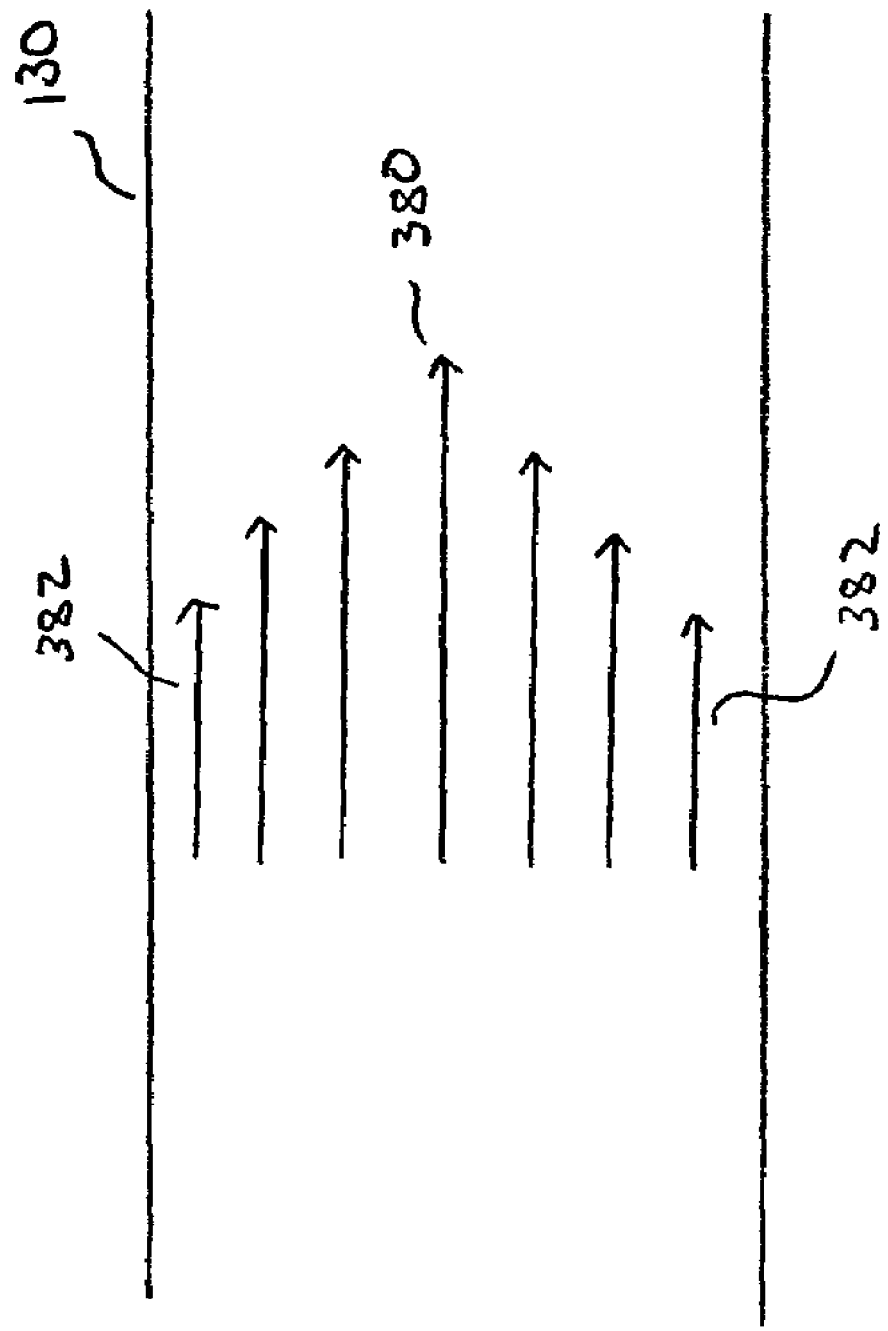

ULTRASONIC LIQUID FLOW CONTROLLER

BACKGROUND

1. Field of the Invention

The present invention relates to liquid flow controllers and more particularly to an ultrasonic liquid flow meter that may be used in a liquid flow controller.

2. Discussion of Related Art

Various prior art techniques for measuring a flow rate of a fluid, such as a liquid or gas, flowing in a conduit, for example, a pipe or tube, are known, including thermal flow meters, coriolis force flow meters, and differential pressure flow meters. It is also known to incorporate these and other types of flow meters in feedback control loops so as to control the flow of a fluid in a system.

During manufacture of semiconductor devices, many different fluids must be precisely and accurately dispensed for use on a wafer surface being treated. For example, in a conventional apparatus, the wafers to be treated are typically positioned beneath a nozzle that then dispenses a predetermined amount of fluid (e.g., water, slurry, etchant, etc.) to coat or treat the wafer.

As the level of integration on semiconductor wafers increases, surface irregularities have become a serious problem. For example, metallization layers used to form interconnects between the various devices on a wafer may lead to substantial surface irregularities that may interfere with subsequent photolithographic steps. As a result, several processes have been developed to "flatten" or remove surface irregularities from a wafer without damaging the devices being formed on the wafer. One example of such a process is chemical-mechanical planarization (CMP) which is a polishing method that uses a planarization fluid, usually including abrasive particles and/or chemical etchants, to grind away surface irregularities as the wafer is rotated against a polishing pad.

The planarization fluids used in CMP may typically be provided to wafer manufacturers in a commercially prepackaged form, which may include two or more fluid components that are combined prior to planarizing a production run of wafers. Once the fluid components are mixed together, the resulting planarization fluid is distributed to wafer planarization machines and used to polish semiconductor wafers.

A significant disadvantage of conventional planarization systems is that the planarization fluid cannot be mixed close to where (and when) it will be used. Rather, the fluid components are mixed and stored in a storage tank, which usually requires a continually running motor, pump, or mixer to agitate the fluid and prevent the component fluids from separating, particularly, to prevent abrasive particles from separating out from the rest of the fluid. It would be advantageous to instead implement "point-of-use" mixing of the components of the planarization fluid and avoid the need for and expense of storing and continually agitating the fluids. In addition, the mixing and use of planarization fluid on an "as-needed" basis would be advantageous because the chemical etchants typically present in the planarization fluid are subject to chemical degradation and should be used soon after mixing.

The amounts and compositions of planarization fluids supplied to wafers is critical to proper manufacturing of semiconductor devices. Conventional flow meters and flow controllers lack the accuracy often needed to implement point-of-use mixing of planarization fluids. Thus, a need exists for an accurate, small-sized fluid flow controller that may be used for, among other things, controlling the fluids used in semiconductor manufacturing to allow point-of-use mixing and accurate dispensing of such fluids.

SUMMARY OF THE INVENTION

According to one aspect of the present invention, an ultrasonic flow meter is provided that comprises a conduit, a first ultrasonic transducer, a second ultrasonic transducer, and a controller. The first ultrasonic transducer is disposed at a first position along a length of the conduit, and the second ultrasonic transducer is disposed at a second position along the length of the conduit that is spaced apart from the first position. The first ultrasonic transducer is configured to transmit a first ultrasonic signal and to receive a second ultrasonic signal, and the second ultrasonic transducer is configured to transmit the second ultrasonic signal and to receive the first ultrasonic signal. The controller is configured to cross-correlate the first received ultrasonic signal and the second received ultrasonic signal and generate a resulting time-domain signal, analyze the resulting time-domain signal to determine a difference in transit time between the first received ultrasonic signal and the second received ultrasonic signal, and calculate a rate of flow of a fluid in the conduit based upon the determined difference. Advantageously, the first and second ultrasonic signals may be transmitted after a determined delay relative to a reference event, such that only the received ultrasonic signals are compared to calculate the rate of flow of the fluid.

According to one embodiment, a method of determining a rate of flow of a fluid in a conduit is provided. The method comprises acts of sending first and second ultrasonic signals along a length of the conduit, receiving the first and second ultrasonic signals, cross-correlating the first received ultrasonic signal and the second received ultrasonic signal to generate a resulting time-domain signal, analyzing the resulting time-domain signal to determine a difference in transit time between the first received ultrasonic signal and the second received ultrasonic signal, and calculating the rate of flow of the fluid in the conduit based upon the determined difference.

According to a further embodiment, the act of cross-correlating may include performing a Fourier transform on the first received ultrasonic signal to generate a first frequency-domain representation, performing a Hilbert transform and a Fourier transform on the second received ultrasonic signal to generate a second frequency-domain representation, multiplying the first and second frequency-domain representations together to generate a resulting frequency-domain representation, and performing an inverse Fourier transform on the resulting frequency-domain representation to generate the resulting time-domain signal.

According to another aspect of the present invention, an ultrasonic flow meter is provided that comprises a conduit, a first ultrasonic transducer, disposed at a first position along a length of the conduit, to transmit a first ultrasonic signal and to receive a second ultrasonic signal, and a second ultrasonic transducer, disposed at a second position along the length of the conduit that is spaced apart from the first position, to transmit the second ultrasonic signal and to receive the first ultrasonic signal. The flow meter further comprises a timing circuit, electrically coupled to the first and second ultrasonic transducers, to initiate transmission of the first and second ultrasonic signals after a determined delay relative to a reference event, and a controller to process the first and second received ultrasonic signals and determine a difference in time between receipt of the first received ultrasonic signal and receipt of the second received ultrasonic signal relative to the reference event.

According to one embodiment, a method of determining a rate of flow of a fluid in a conduit is provided. The method comprises acts of transmitting a first ultrasonic signal from a first position disposed along a length of the conduit, and transmitting a second ultrasonic signal from a second position disposed along the length of the conduit, the second position being spaced apart along the length of the conduit from the first position by a distance. The method further comprises receiving the first ultrasonic signal at the second position, receiving the second ultrasonic signal at the first position, determining a speed of propagation of at least one of the first and second ultrasonic signals in the fluid, processing only the received first and second ultrasonic signals to determine a difference in time between receipt of the first ultrasonic signal and receipt of the second ultrasonic signal, and calculating the rate of flow of the fluid based upon the determined speed of propagation and the determined difference in time between the receipt of the first ultrasonic signal and the receipt of the second ultrasonic signal.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 11 is a diagram illustrating variable flow rate of a fluid in a conduit.

DETAILED DESCRIPTION

Figure 1:
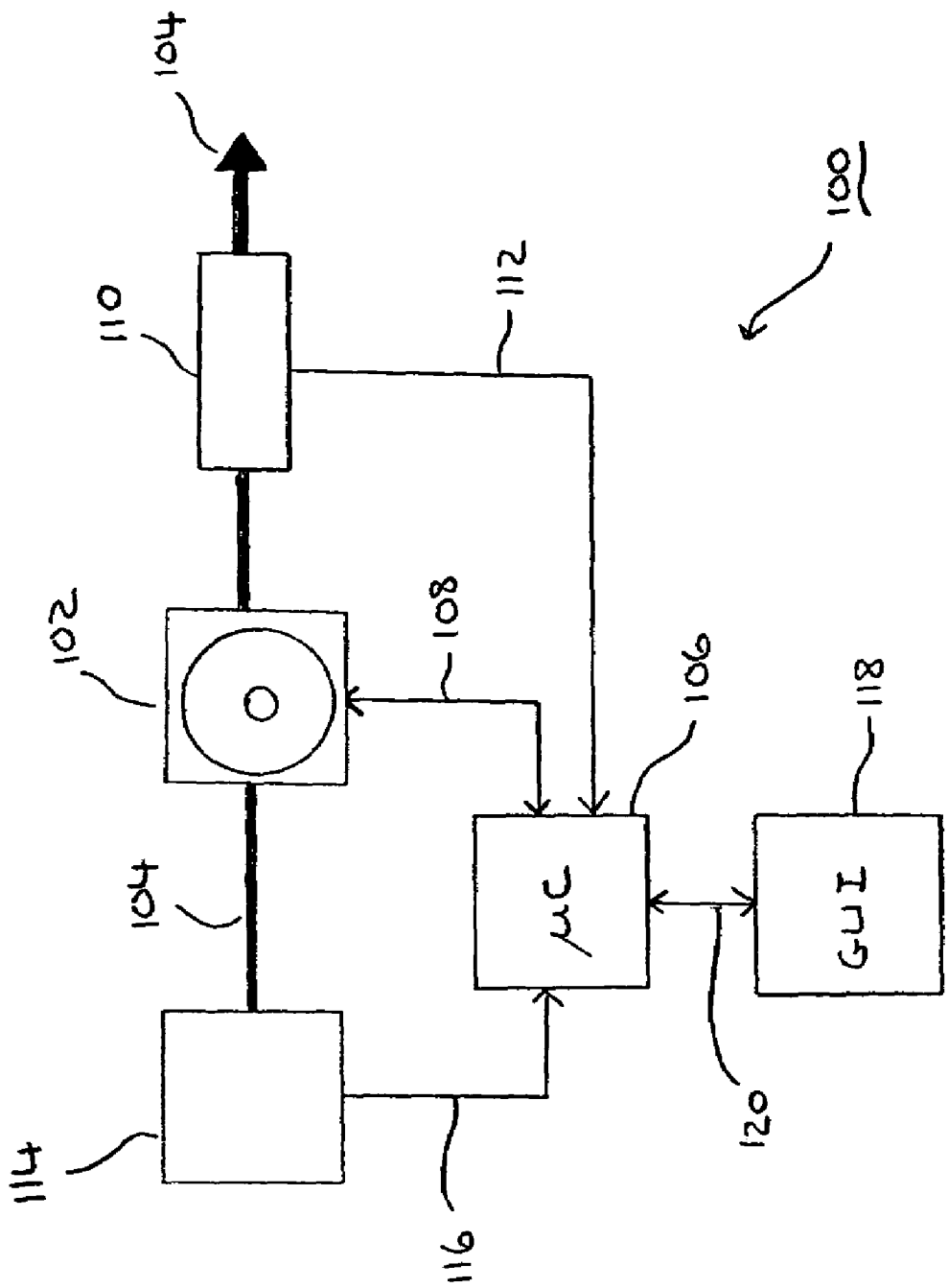
FIG. 1 is a schematic block diagram of one embodiment of a closed-loop monitoring and control system for liquid flow according to aspects of the invention.

Various embodiments and aspects thereof will now be discussed in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present invention include a method and apparatus for monitoring and closed-loop-control of flow of fluids in a system. In one example, the fluids being monitored and controlled may flow to a semiconductor wafer chemical-mechanical planarization (CMP) machine. However, the invention is not limited to the field of semiconductor manufacturing and the principles of the invention described herein may be applied to monitor and control any fluid in any system such as, for example, systems used to manufacture pharmaceutical products. According to some embodiments, there are provided process-transparent (i.e., can be used with any type of process) technologies for use at process tools that provide real-time measurements of fluid chemical concentration and/or flow rate. These technologies have significant applications in monitoring and control systems, including point-of-use blending and delivery, for all liquids-based process areas, including, but not limited to, semiconductor manufacturing.

The determination of certain chemical and physical properties of liquid chemicals has become increasingly important to semiconductor device manufacturers. This is driven by several challenges facing process and equipment engineers, including: 1) the impacts liquid chemicals have on wafer surface defects, device performance and yield; 2) the high cost of the fluid components used in liquid-based processes like Copper-CMP; and 3) the environmental impact of effluent streams bearing liquid chemical waste. These factors all contribute to the desirability of point-of-use mixing and accurate dispensing of liquids for various chemical processes.

Conventional systems, including flow controllers and meters, lack accurate point-of-use sensors in process tools that can provide information about certain properties of liquid chemicals including, but not limited to, concentration and flow rate. Point-of-use sensors (such as flow meters) are a core technology that is needed to address industry challenges. However, to realize the greatest benefit, these point-of-use sensors should be embedded in monitoring and control systems. With the aid of point-of-use accurate flow meters, process and equipment engineers may have the capability to accelerate process development, reduce chemical consumption and wafer scrap (leading to significant direct cost savings) and minimize environmental impact. Furthermore, a point-of-use chemical blending and delivery system may be able to accurately determine and control the amounts of chemicals used in a process by simultaneously measuring concentration and flow rate at the point-of-use.

Point-of-use sensor technologies developed specifically for use at process tools satisfy the needs for in-situ use: real-time measurement, compact size, non-intrusive, no moving parts, and process transparency. It is often desirable that these sensors should have high reliability, accuracy, and precision, and also the appropriate dynamic range for specific manufacturing applications. Various embodiments and aspects of the invention are related to point-of-use sensor technologies for monitoring and control of liquid chemicals such as, for example, CMP slurry fluids.

To provide desired results for process tool owners, it is often desirable that point-of-use chemical control systems have the capability to accurately set and determine liquid flow. Referring to FIG. 1, there is illustrated a block diagram of one example of a fluid control system according to aspects of the invention. The system 100 as illustrated includes a controllable valve 102 through which fluid flows, as indicated by line/arrow 104. It is to be appreciated that although the following discussion will refer primarily to element 102 being a controllable or variable valve, element 102 may also be another type of fluid actuator such as, for example, a pump. The valve 102 may be, for example, an electronically controlled variable valve that may be adjusted to vary the flow of the fluid through the system. The valve 102 is controlled by a controller 106 as indicated by line 108. The controller 106 may be, for example, a microprocessor-based controller. A fluid flow meter 110 may be positioned downstream of the valve 102, as shown. The flow of the fluid may be measured by the flow meter 110 that may communicate with the controller 106, as indicated by line 112. As illustrated in FIG. 1, in one example, the flow meter 110 may be integral to the fluid line 104, such that fluid flowing in the fluid line 104 also flows through the flow meter 110. It is to be appreciated that the flow meter 110 may be integral with the entire fluid line 104, or may be positioned in a branch or bypass fluid line such that the flow meter 110 may measure only a portion of the entire fluid stream.

According to at least one embodiment, the controller 106 may be adapted to use information, such as a flow rate of the fluid, provided by the flow meter 110 to monitor the flow of the fluid and to control the valve 102 to achieve a desired rate of flow, thereby providing closed-loop control of the fluid flow in the system 100. In one embodiment, control of the fluid flow is achieved by a control system in which the fluid flow meter 110 is a feedback element in a closed loop system, as illustrated in FIG. 1. The flow meter 110 produces an electronic signal indicative of the rate of flow of the fluid through the fluid line 104. The flow meter signal 112 may provide real-time feedback of fluid flow and may be input to the controller 106. A signal produced by the controller 106 is input to an actuator driving the valve 102 (as indicated by line 108) and may be used to control the valve 102 so as to vary the rate of flow as required to achieve the desired rate of fluid flow. The desired fluid flow rate may also be an input parameter to the controller 106. For example, the fluid may enter the illustrated portion of the system 100 from a source 114 which may be, for example, an upstream element in the system 100, a storage element, and the like. The source 114 may include sensors that may provide information to the controller 106, as indicated by line 116, such as set-points and limits of the amount of fluid available, temperature, pressure, concentration, density, etc., and possibly an initial flow rate of the fluid. The controller 106 may be adapted to use such information, and other inputs, to adjust the flow rate of fluid in fluid line 104.

In addition, as illustrated in FIG. 1, the controller 106 may be coupled to a user interface 118 which may be, for example, a graphically based user interface. The user interface 118 may allow a user to monitor the system and to provide input to the controller 106, as indicated by line 120. The user may be able, via the user interface 118, to observe parameters of the system (provided by the controller 106) and to provide inputs to the controller 106 such as, for example, a desired flow rate of the fluid, fluid flow rate set points and upper and lower flow rate limits. The controller 106 may output to the user interface 118 various information including, for example, actual flow rate, out-of-limit alarms, and data management and data decision support information. It is also to be appreciated that the controller 106 may be coupled to another system computer instead of, or as well as, being coupled to the user interface 118.

It is to be appreciated that the controller 106 may be programmed with one of a variety of programs for controlling the valve 102. In one example, the controller may be programmed with a model for the valve and may use parameters of the valve and fluids determined during calibration to vary the degree to which the valve 102 is opened so as to control the rate of flow of the fluid. Such methods are described in detail in commonly-owned U.S. patent application Ser. No. 10/131,603, filed Apr. 24, 2002, entitled SYSTEM AND METHOD FOR A MASS FLOW CONTROLLER and U.S. patent application Ser. No. 10/622,080, filed Jul. 17, 2003, entitled METHODS AND APPARATUS FOR PRESSURE COMPENSATION IN A MASS FLOW CONTROLLER, which are herein incorporated by reference in their entirety. In another example, the controller may be adapted to use a "model-free" adaptive control algorithm to drive the valve 102. This method includes a feedback "neuron-based" control algorithm that is independent of the particular fluid flowing in the system and does not require a priori knowledge of the dynamics of the system. At least one embodiment of this method is described in detail in U.S. Pat. No. 6,684,112 to George Shu-Xing Cheng, which is herein incorporated by reference in its entirety.

According to one embodiment, the flow meter 110 may be an ultrasonic flow meter that is adapted to use the relative velocity of ultrasonic waves propagated through the fluid to determine the flow rate of the fluid. Although ultrasound sensors have been used to measure flow rates of fluids in manufacturing markets other than semiconductors, these ultrasound sensors typically do not have the accuracy or speed needed for use in semiconductor manufacturing and point-of-use applications.

Figure 2:
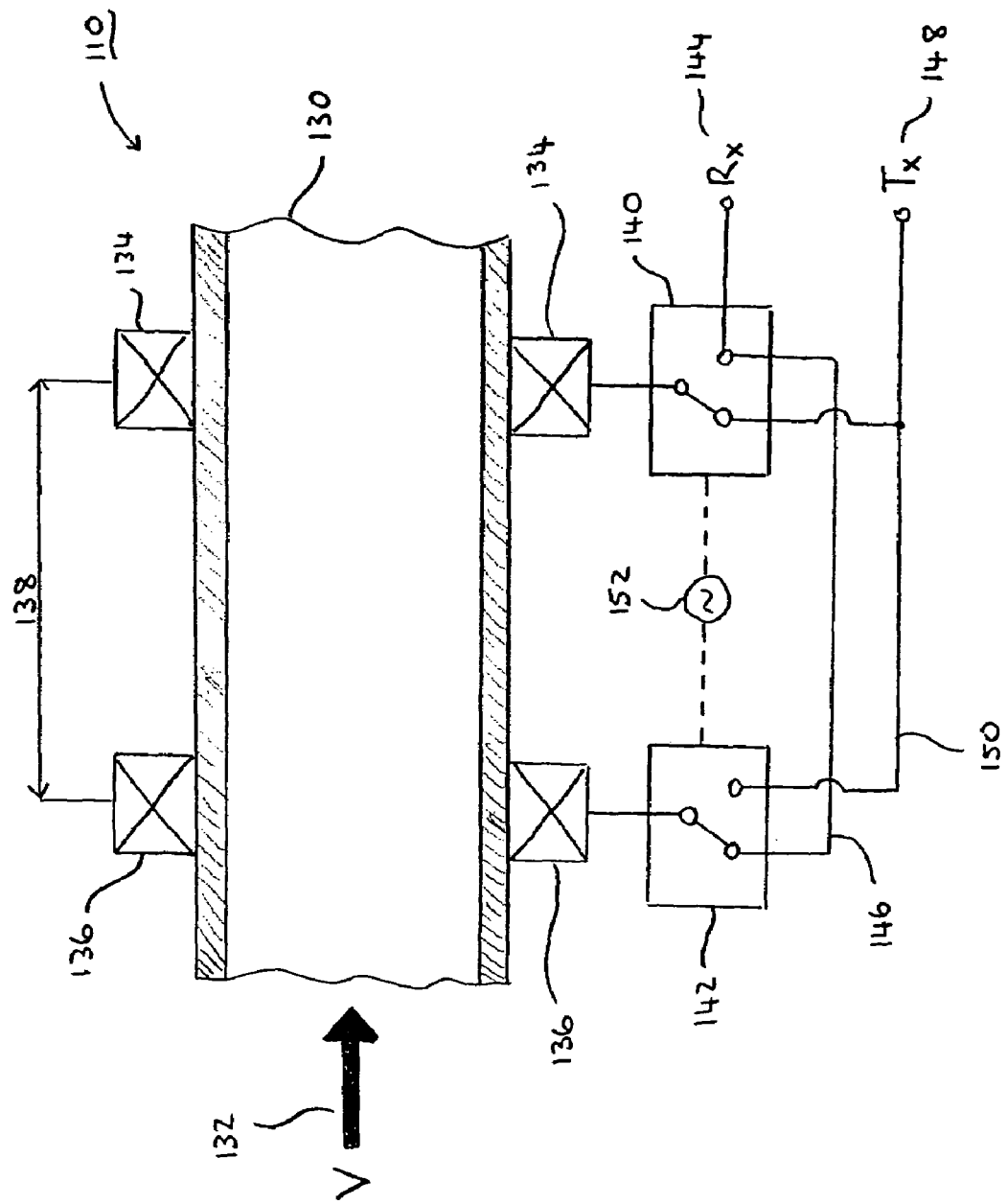
FIG. 2 is a schematic diagram of one embodiment of an ultrasonic flow meter according to aspects of the invention.

Referring to FIG. 2, there is illustrated schematically one embodiment of an ultrasonic flow meter according to aspects of the invention. In a system, such as system 100 (see FIG. 1), fluid flows through a tube or conduit 130, as indicated by arrow 132. In the illustrated embodiment, a first ultrasonic transducer 134 is mounted to the conduit 130 at a first location and a second ultrasonic transducer 136 is mounted to the conduit 130 at a second location, positioned a distance 138 away from the first ultrasonic transducer. According to one example, each ultrasonic transducer 134, 136 may comprise a piezoelectric transducer (vibrator) that includes a piezoelectric ceramic element (for example, lead zirconate-titanate) and a pair of electrodes for applying an electric voltage to the piezoelectric ceramic element. Each of the ultrasonic transducers 134, 136 may produce an ultrasonic wave when an electric voltage is applied thereto, and may produce an electric voltage when it receives an ultrasonic wave. Thus, each of ultrasonic transducers 134, 136 may function as an ultrasonic wave generator and/or an ultrasonic wave receiver. In one example, the ultrasonic transducers may each be ring-shaped piezoelectric oscillators that may be mounted to an exterior surface of the conduit 130, as illustrated in FIG. 2. It should be appreciated that the ultrasonic transducers 134, 136 need not be ring-shaped, as other shapes may alternatively be used, provided they are capable of directing ultrasonic energy into a fluid within the conduit 130 and causing at least some of that energy to propagate as ultrasonic waves traveling through the fluid lengthwise within the conduit 130. For example, the ultrasonic transducers 134, 136 may form only a portion (e.g., one-half) of a ring, or alternatively still, the ultrasonic transducers 134, 136 may be disposed at end portions of the conduit 130 as illustrated in FIGS. 7, 8a, 8b, and 9 in U.S. Pat. No. 6,055,868, which is herein incorporated by reference in its entirety.

According to one embodiment, the first ultrasonic transducer 134 may be connected to a first switch 140 and the second ultrasonic transducer 136 may be connected to a second switch 142. A first terminal of each of the first and second switches 140, 142 may be connected to a receiver circuit 144, as shown by line 146 and a second terminal of each of the first and second switches 140, 142 may be connected to a transmitter (or wave generation) circuit 148, as indicated by line 150. The switches may be driven (i.e., changed from one state to another) by a trigger circuit 152 that may include, for example, a clock oscillator or other switching mechanism. The switches 140, 142 may be arranged such that with each trigger signal from the trigger circuit 152, the switches change states, thereby switching the first and second ultrasonic transducers 134, 136 between transmit and receive states. For example, when the first ultrasonic transducer 134 is connected to the transmitter circuit 148 (i.e., is acting as an ultrasonic wave generator), the second ultrasonic transducer 136 is connected to the receiver circuit 144 to receive the ultrasonic wave generated by the first ultrasonic transducer 134. A signal from the trigger circuit 152 may then cause the switches to change state, such that the first ultrasonic transducer 134 becomes connected to the receiver circuit 144 and the second ultrasonic transducer 136 becomes connected to the transmitter circuit 148. In this manner both upstream (i.e., moving against the flow of the fluid) ultrasonic waves and downstream (i.e., moving with the flow of the fluid) ultrasonic waves may be generated and received.

The flow rate of the fluid flowing inside the conduit 130 may be determined by measuring the time taken for both an upstream ultrasonic wave and a downstream ultrasonic wave to travel between the two ultrasonic transducers 134, 136. The transit time difference between the upstream ultrasonic wave and the downstream ultrasonic wave is proportional to the rate of flow of the fluid flowing in the conduit 130. When there is no fluid flowing through the conduit 130, or any fluid in the conduit 130 is still, the time taken for the upstream and downstream ultrasonic waves to propagate between the two ultrasonic transducers 134, 136 should be the same, and thus the time difference should be approximately zero. Any fluid flow may be indicated by a non-zero transit time difference. It is to be appreciated that the flow rate of the fluid may be determined from the velocity of the fluid, that may be calculated from the transit times of the ultrasonic waves through the fluid, and various physical parameters of the system, such as the cross-sectional area of the conduit, specific density of the fluid, etc.

According to one embodiment, a liquid flow meter, including two ultrasonic transducers such as illustrated in FIG. 2, may be adapted to determine the rate of flow of liquid in a conduit using the following method. The time taken for each of an upstream ultrasonic wave and a downstream ultrasonic wave to propagate between the two ultrasonic transducers may be measured using, for example, a mathematical correlation between sent and received signals. The transit time difference between the upstream and downstream waves may then be calculated and the velocity of the fluid determined from this transit time difference. Averaging techniques may be employed to improve the accuracy of the measurements and calculations. The method, and variations thereof, are described in more detail below. It is to be appreciated that the liquid flow meter may include a controller that may be programmed with one or more sets of instructions for performing necessary mathematical calculations.

Figure 3:
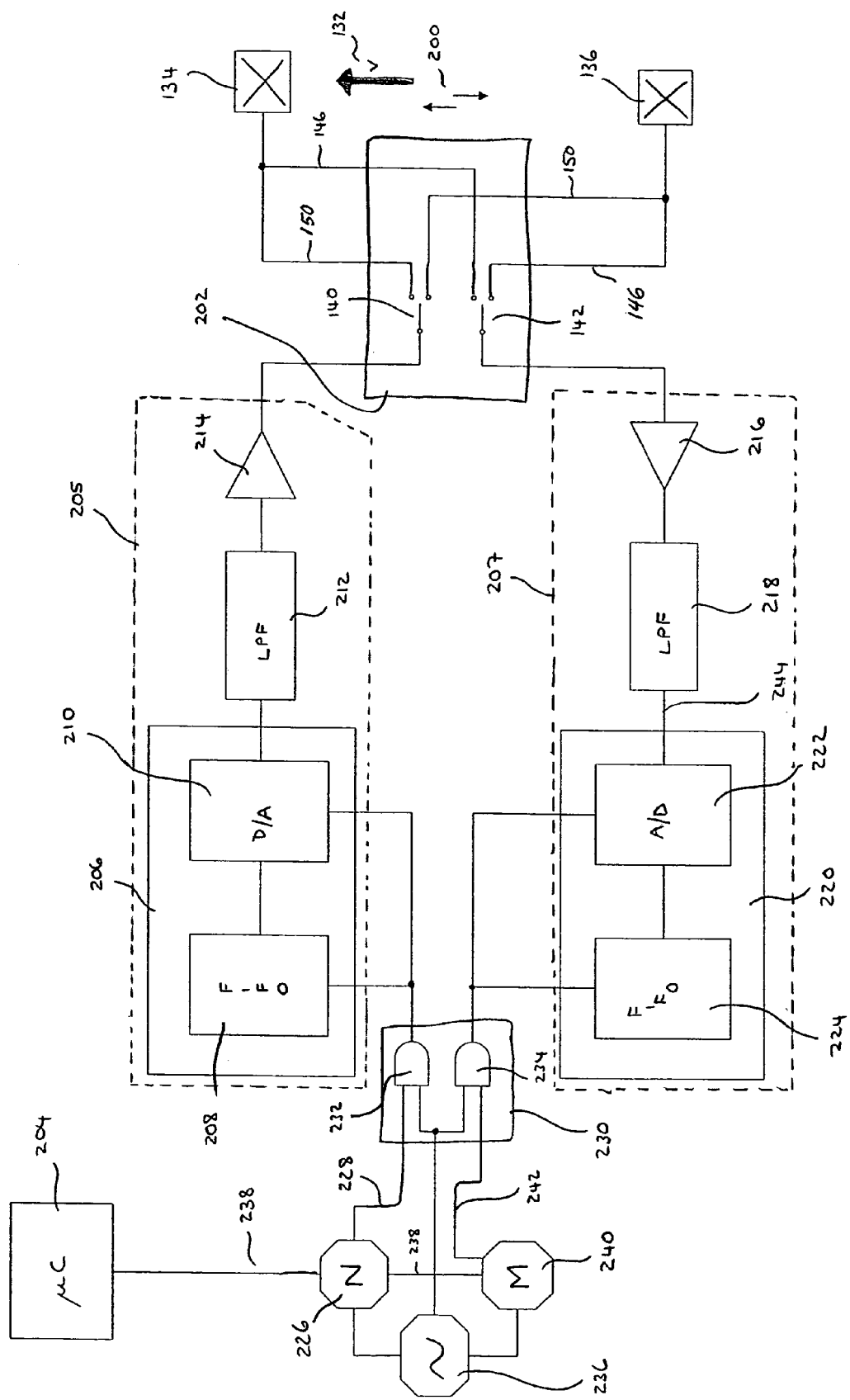
FIG. 3 is a block diagram of one embodiment of an ultrasonic liquid flow controller according to aspects of the invention.

Referring to FIG. 3, there is illustrated one embodiment of an ultrasonic liquid flow meter 110 according to aspects of the invention. The flow meter may comprise a first ultrasonic transducer 134 and a second ultrasonic transducer 136, as described with reference to FIG. 2. Flow of the fluid between the two sensors is indicated by arrow 132. Propagation of upstream and downstream ultrasonic waves is indicated by arrows 200. As discussed above, the flow meter 110 may include a switching circuit 202 that allows the two ultrasonic transducers 134, 136 to be switched between transmit and receive modes. The flow meter 110 may further include a controller 204 such as, for example, a micro-processor based controller, that is programmed to control the electronic circuitry of the flow meter and to interface with other system components. In one example, the controller 204 may include a digital signal processor (DSP), such as, for example, a TMS320C64xx DSP available from Texas Instruments, Inc. It is to be appreciated that the flow meter 110 may be provided as a stand-alone unit, or may form part of a flow controller (such as the flow controller illustrated in FIG. 1) in which case the controller 204 may be the same unit as controller 106 (see FIG. 1) or may be a separate controller. The controller 204 and various electronic components of the flow meter 110 are discussed in more detail below.

Figure 4:
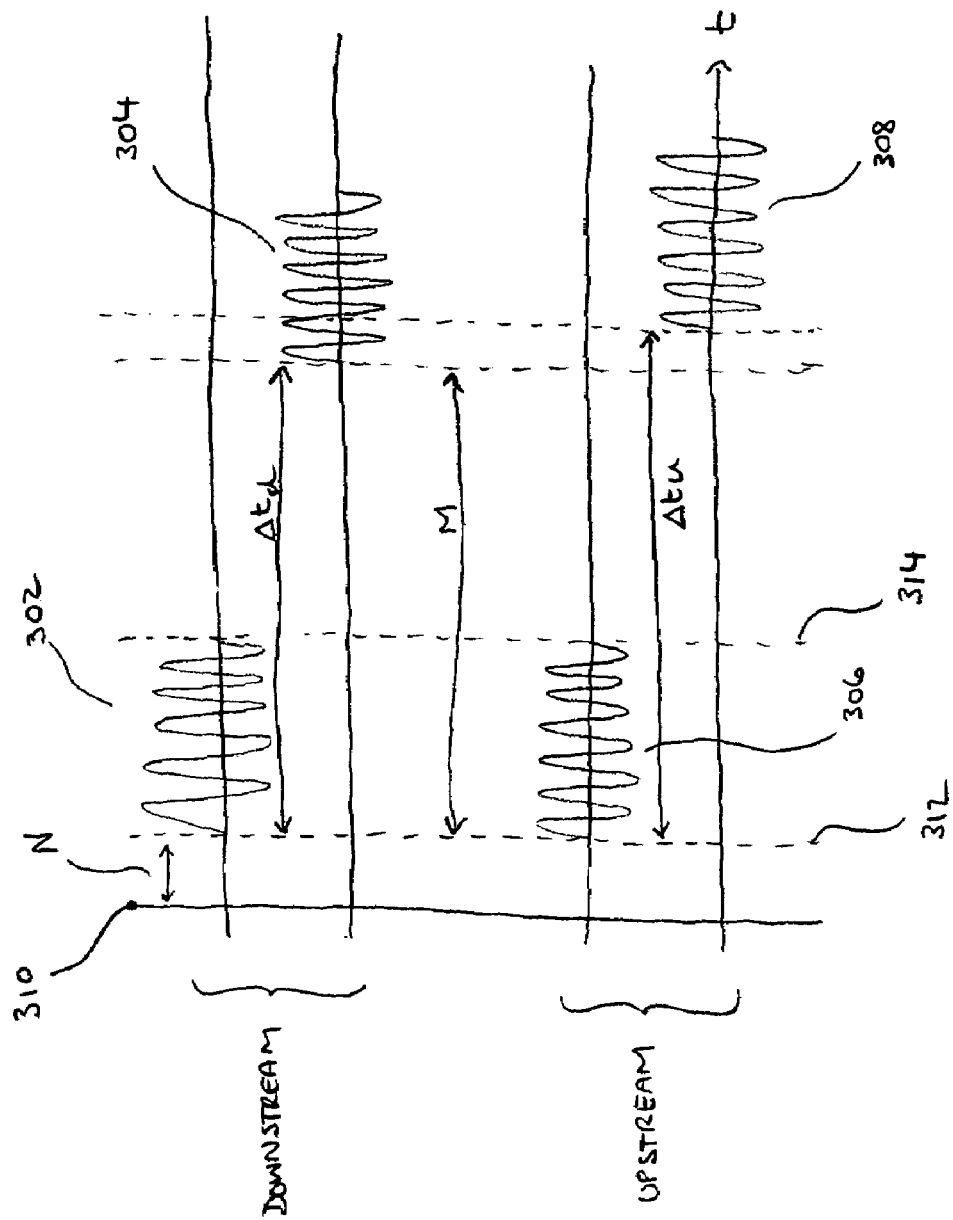
FIG. 4 is a timing diagram illustrating one example of ultrasonic signals according to aspects of the invention.

Referring to FIG. 4, there is illustrated one example of a timing diagram for sent (i.e. transmitted) and received upstream and downstream ultrasonic signals. For example, ultrasonic transducer 136 may be switched to transmit mode and may be controlled (via an applied electronic voltage or current) to generate a downstream sent signal 302. Ultrasonic transducer 134 may cooperatively be switched to receive mode to detect a corresponding downstream received signal 304. The time difference $\Delta t_d$ (the time taken for the received signal 304 to be detected after the sent signal 302 has been transmitted) is affected by both the speed of propagation of the signal in the fluid and the rate of flow of the fluid. Similarly, the switching circuit 202 may be triggered to put ultrasonic transducer 136 in the receive mode and ultrasonic transducer 134 into the transmit mode. Ultrasonic transducer 134 may generate an upstream sent signal 306 that may subsequently be detected by ultrasonic transducer 136 as upstream received signal 308. The time difference $\Delta t_u$ (the time taken for the received signal 308 to be detected after the sent signal 306 has been transmitted) is also affected by both the speed of propagation of the signal in the fluid and the rate of flow of the fluid. Thus, according to aspects of the invention, the speed of propagation of the signal in the medium may be determined, using both upstream and downstream transmissions, such that the rate of flow of the fluid may then be determined from one or both of $\Delta t_d$ and $\Delta t_u$, and various physical parameters of the system, as discussed above.

According to one embodiment, the sent signals 302, 306 may be digitally created using, for example, direct digital synthesis. Referring to FIG. 3, a transmitter circuit 205 of the flow meter circuitry may include a transmitter digital-to-analog (D/A) converter circuit 206 that may comprise a storage element 208, such as, for example, a FIFO, and a D/A 210. The storage element 208, which may be, for example, a first-in-first-out non-volatile memory device, may store one or more digital sequences that may correspond to a desired sent signal. More specifically, the storage element 208 may comprise a digital sequence that, when the storage element 208 is activated by the controller 204, is sent to the D/A 210 and converted into an analog electronic signal. This analog electronic signal may be filtered by filter 212, which may be, for example a bandpass or lowpass filter, and amplified by a driver amplifier 214. It should be appreciated that because the ultrasonic transducers and the transmission channel provide so much high-frequency rejection, the filter 212 may be omitted in certain embodiments and the output of the D/A 210 connected to the input of the driver amplifier 214. The amplified electronic signal may then be applied, via the switching circuit 202, to an appropriate one of the ultrasonic transducers 134, 136. In response to being excited by the applied analog electronic signal, the ultrasonic transducer 134 or 136 may generate an ultrasonic wave, thereby producing either the downstream sent signal 302 or the upstream sent signal 306. It is to be appreciated that the transmitter circuit 205 may include additional elements, or modified replacements for the elements shown, as known to those skilled in the art. The exact elements of the transmitter circuit 205 are not critical to the invention, provided the circuitry functions to produce an electronic signal that may be used to drive the ultrasonic transducers to produce desired ultrasonic waves. The transmitter circuit 205 illustrated in FIG. 3 is provided as one example of an appropriate device and is not intended to be limiting. Further, it should be appreciated that although in the illustrated embodiment of FIG. 3, both ultrasonic transducers 134, 136 share the same transmitter circuit 205, separate transmitter circuits may alternatively be provided for each transducer.

Similarly, when a received signal 304 or 308 arrives at either ultrasonic transducer 134 or 136, the received signal may be detected by the ultrasonic transducer which produces an electronic signal in response. This electronic signal may be applied to a receiver circuit 207 of the flow meter circuitry. For example, the received electronic signal may be amplified by an amplifier 216 and filtered by a filter 218 which may be, for example, a lowpass or bandpass filter. As with the transmitter circuit 205, the filter 218 may be omitted in certain embodiments. The signal may then be applied to an analog-to-digital (A/D) converter circuit 220 which may convert the electronic signal to a digital signal (using A/D 222) and store the resulting digital signal in a storage element 224 which may be, for example, a FIFO. Again it is to be appreciated that the receiver circuit 207 may include additional elements, or modified replacements for the elements shown, as known to those skilled in the art. The exact elements of the receiver circuit 207 are not critical to the invention, provided the circuitry functions to receive the electronic signal produced by the ultrasonic transducers in response to receiving ultrasonic waves and to provide a recovered signal for processing by the controller 204. The receiver circuit 207 illustrated in FIG. 3 is provided as one example of an appropriate device and is not intended to be limiting. Further, as with the transmitter circuit 205, separate receiver circuits may alternatively be provided for each ultrasonic transducer 134, 136.

Referring again to FIG. 4, one aspect of the invention may include synchronizing the transmitter and receiver portions of the circuitry to a known "zero" time, as indicated by line 310. Each of the upstream and downstream sent signals may then be sent at a known time, indicated by line 312, relative to the zero time. This known time may be represented by a digital counter value of N. Thus, each sent signal 302, 306 may be transmitted at a known relative moment in time, N, that may be always constant. It should be appreciated that although it may be preferable to transmit each sent signal 302, 306 at the same relative moment in time (e.g., responsive to the same relative event), sent signal 306 may alternatively be sent at a different relative moment in time from sent signal 302, as long as the difference between the two relative moments is known or may be otherwise determined.

Referring to FIG. 3, according to one embodiment, the flow meter circuitry may include a counter 226 having a set value N. The controller may trigger (on line 238) the counter 226 to begin counting at time zero up to N from an initial value or count, zero for example. When the counter 226 reaches N, it provides an end-of-count signal on line 228 that is, in turn, applied to a control gate 230. The control gate 230, upon receipt of the end-of-count signal, triggers the storage element 208 to send the digital sequence to the D/A 210 to provide the electronic signal that causes the appropriate ultrasonic transducer 134 or 136 to generate an ultrasonic wave. Thus, the controller 204 causes the ultrasonic transducer 134 or 136 to generate the sent ultrasonic wave at a precise known time after zero, namely the relative moment in time N, irrespective of which ultrasonic transducer is being used to transmit the ultrasonic signal.

The control gate 230 may include, for example, two AND gates 232, 234, as illustrated. However, the control gate is not limited to the specific embodiment shown in FIG. 3. The control gate 230 may include any appropriate circuitry that acts to trigger the D/A converter circuit 206 and the A/D converter circuit 220 at a predetermined time so as to generate and receive the sent and received ultrasonic waves. The control gate 230 may be driven by a clock oscillator 236 that may be the same as, or different from, the clock oscillator used to drive the switching circuit 202 (see FIG. 3).

According to one embodiment, the receiver side of the flow meter circuitry may also include a counter 240 that may also be triggered (as shown by line 238) by the controller 204 to begin counting from an initial value or count, for example, zero up to a value M that is generally larger than value N. It is to be appreciated that the value M may be equal to, or nearly equal, to N or may be slightly larger or substantially larger than N. When the counter 240 reaches M, it may provide an end-of-count signal on line 242 to trigger the control gate 230 which may, in turn, trigger the receiver A/D converter circuit 220 to begin receiving/storing data.

It is to be appreciated that rather than triggering the receiver side based upon the counter 240, counter 226 may be used, or alternatively, the receiver A/D converter circuit 220 may operate continuously, converting the signal provided on line 244 into a digital sequence (using A/D 222) and storing the digital sequence in storage element 224. However, continuous operation may be inefficient because, during the time when no ultrasonic wave is being detected (e.g., prior to the signal 302 being sent, or even shortly thereafter), the signal on line 244 will contain little useful data and thus storing the resulting digital sequence may be of little use. Therefore, to maximize efficiency, the counter 240 may trigger the receiver A/D converter circuit 220 to convert and store digital data only when it is likely that the signal provided on line 244 contains useful information about a received ultrasonic wave. In one embodiment, the value M may be set to correspond to a time value slightly before arrival of the received ultrasonic waves 304 or 308 is expected, as shown in FIG. 4. Alternatively, the value M may be set to correspond to a time shortly after the sent ultrasonic waves 302 or 306 are transmitted, e.g., slightly larger than N. In this manner, the receiver circuit may "turn on" (i.e., begin converting and storing data) soon enough so that no portion of the received ultrasonic waves 304 or 308 is lost, but late enough that it does not spend a large amount of time storing data that is of little use. Alternatively still, counter 226 may be used to trigger both the transmit and receive circuits.

Thus, the storage element 208 may store a digital representation of the sent ultrasonic waves 302, 306 and the storage element 224 may store digital representations of the received ultrasonic waves 304, 308. It should be understood by those skilled in the art, that the time delay between transmission of the upstream ultrasonic wave 306 and transmission of the downstream ultrasonic wave 302, or vice versa, should be sufficiently long to avoid interference between the two ultrasonic waves, but not too long, as the flow rate of the fluid could change over longer time intervals. The controller 204 may access the storage elements 208, 224 in a conventional manner to retrieve these digital representations for processing to recover information such as the speed of propagation of the ultrasonic waves in the fluid and the rate of flow of the fluid. Examples of algorithms that the controller 204 may implement to recover such information are described below.

As discussed above, the transit time of the upstream and/or downstream ultrasonic waves is proportional to the average liquid velocity and therefore the average liquid flow rate. According to one embodiment, the liquid flow rate may be determined from a difference ($\Delta t$) between the transit time ($\Delta t_u$) of the upstream ultrasonic wave and a transit time ($\Delta t_d$) of the downstream ultrasonic wave. Because the start times of the sent ultrasonic waves may be synchronized (as shown in FIG. 3), the time difference $\Delta t$ may be determined directly, i.e., by comparing the relative times at which the received signals 304 and 308 are received, rather than from measurements of the total transit times. Therefore, once the speed of propagation of the ultrasonic waves in the fluid is known, the velocity of the fluid, v, may then be calculated.

The measured values of $\Delta t_d$ and $\Delta t_u$ are related to the distance between the two ultrasonic transducers, the speed of propagation of the ultrasonic waves in the fluid, and the velocity of the fluid according to the relationships:

$$\Delta t_d = \frac{L}{c+v} \quad (1)$$

$$\Delta t_u = \frac{L}{c-v} \quad (2)$$

where c is the speed of propagation of the ultrasonic waves in the fluid, v is the velocity of the fluid and L is the distance (e.g., distance 138 in FIG. 2) between the two ultrasonic transducers. If the sound propagation and the flow of fluid in the conduit are parallel, and if the upstream and downstream transit times are measured over a relatively small interval of time, such that the velocity of the fluid upstream and downstream is relatively constant over the measured time interval and therefore essentially cancels out, the speed of propagation of the ultrasonic waves in the fluid may be estimated by averaging the downstream (with the flow) and upstream (against the flow) transit times ($\Delta t_d$ and $\Delta t_u$) over the distance covered (2L) according to the equation:

$$c \approx \frac{2L}{\Delta t_u + \Delta t_d} \quad (3)$$

The measured difference $\Delta t$ is also given by the formula:

$$\Delta t = \Delta t_u - \Delta t_d \quad (4)$$

Thus, replacing $\Delta t_u$ and $\Delta t_d$ in equation (4) with the representations from equations (1) and (2) and performing some mathematical manipulations, yields the following formula for $\Delta t$:

$$\Delta t = \frac{2Lv}{c^2 - v^2} \quad (5)$$

Therefore, because $\Delta t$ is known (measured), L is known (or may be pre-determined based upon calibration with a known fluid flow), and c may be determined from equation (3) given above, the velocity of the fluid may be calculated from the formula:

$$v = \frac{1}{\Delta t}\left(-L + \sqrt{L^2 + c^2 \Delta t^2}\right) \quad (6)$$

Alternatively, appreciating that the velocity of the fluid is substantially less than the speed of propagation of the ultrasonic waves in the fluid, c, equation (5) may be simplified to:

$$\Delta t \approx \frac{2Lv}{c^2} \quad (7)$$

and the velocity of the fluid may be calculated as:

$$v \approx \frac{c^2 \Delta t}{2L} \quad (8)$$

The rate of flow (e.g., volumetric or mass) of the fluid may then be calculated from the velocity of the fluid and various physical parameters of the system, such as the cross-sectional area of the conduit through which the fluid is flowing, the specific density of the fluid, and the temperature of the fluid. For example, based upon the simplification in equation (7) above, the volumetric flow rate of the fluid, Q, is given by the formula below, wherein A represents the cross-sectional area of the conduit:

$$Q \approx \frac{Ac^2 \Delta t}{2L} \quad (9)$$

The mass flow rate of the fluid may then be determined based upon the volumetric flow rate of the fluid according to equation (9) and fluid-specific density information. It is to be appreciated that several system parameters, like the cross-sectional area of the conduit, the length of the conduit (although to a lesser extent than the cross-sectional area of the conduit), and the specific density of the fluid, may be temperature dependent. Therefore, in one embodiment, a temperature sensor may be included in the system to measure the temperature of the fluid and provide these measurements to the controller 204. The controller 204 may be programmed with information to adjust the calculation of flow rate of the fluid from the velocity of the fluid according to known temperature-dependent correction factors. For example, variations in the cross-sectional area of the conduit and/or the length of the conduit with temperature may be known and such information may be stored in the controller 204, for example, in a look-up table, so that the controller may adjust the calculation of volumetric flow rate to account for such temperature-dependent variations. Similarly, temperature dependent variations in the specific density of the fluid with temperature may also be stored, for example, in a look-up table, to adjust the calculation of mass flow rate to account for temperature dependent variations in the specific density of the fluid.

For example, combining equations (3) and (9) yields:

$$Q = \frac{2LA\Delta t}{(\Delta t_u + \Delta t_d)^2} \quad (10)$$

Within equation (10), the effective cross-sectional area term A and the transducer separation term L may be combined into a single mechanical dimension function K that is a function of temperature T as shown in equation (11) below:

$$Q = \frac{K(T)\Delta t}{(\Delta t_u + \Delta t_d)^2} \quad (11)$$

A calibration fluid with a known speed of sound propagation ($c_1$) may then be flowed through the conduit 130 at a known volumetric flow rate ($Q_1$) to determine the function K(T) for different temperatures by measurement of the transit times $\Delta t_u$ and $\Delta t_d$ and their difference $\Delta t$. For identified fluids having a speed of sound propagation that is different than the calibration fluid, a temperature-dependent correction may be implemented as:

$$Q = \frac{F(T)K(T)\Delta t}{(\Delta t_u + \Delta t_d)^2} \quad (12)$$

where F(T) is a temperature dependent function of the identified fluid being measured. In this manner, variations in the volumetric flow rate due to temperature effects on the mechanical dimensions of the conduit may be taken into account for any of a number of different fluids.

Figure 5:
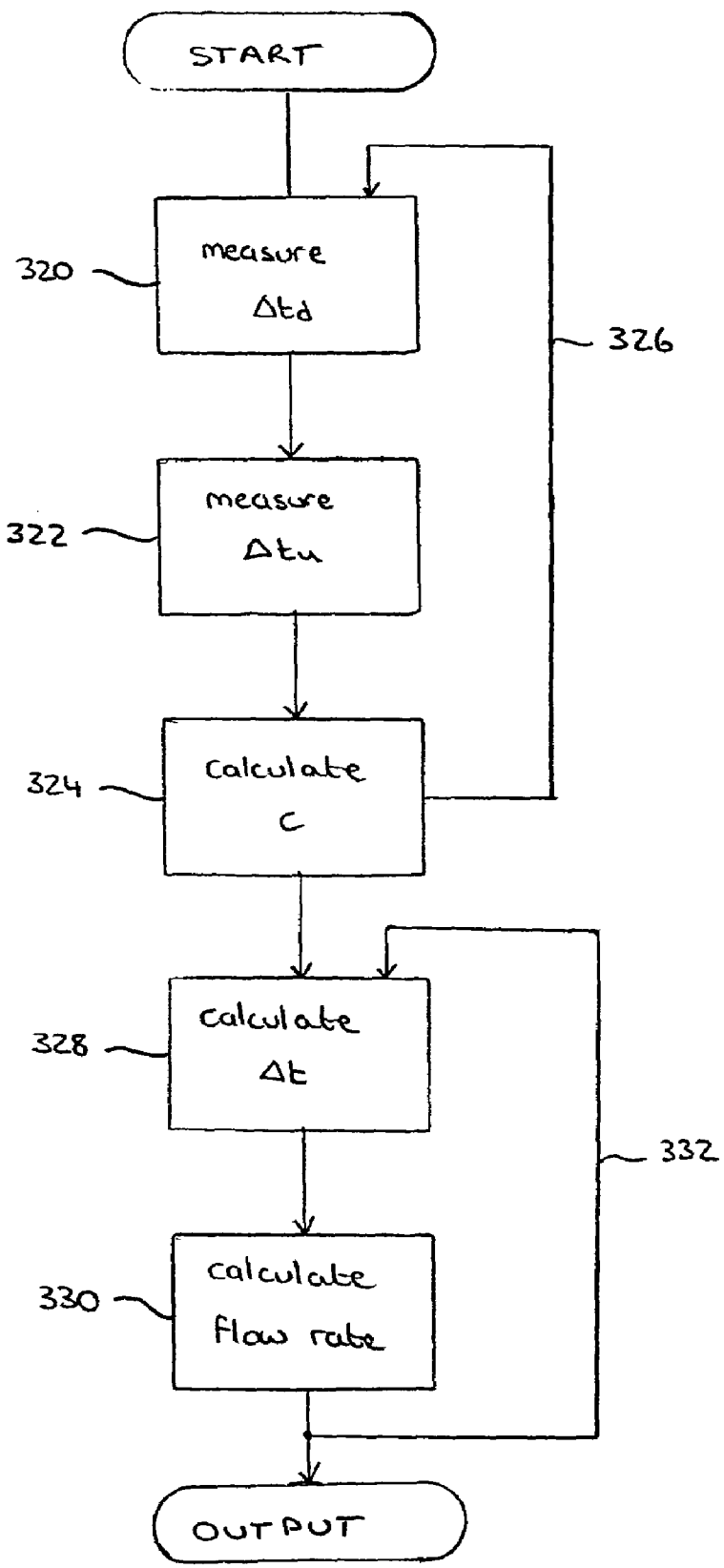
FIG. 5 is a flow diagram illustrating one example of a method for determining flow rate of a fluid according to aspects of the invention.

Referring to FIG. 5, there is illustrated a flow diagram of one embodiment of a method for calculating the flow rate of the fluid. In a first step 320, the transit time $\Delta t_d$ of the downstream ultrasonic wave may be measured/calculated and in second step 322, the transit time $\Delta t_u$ of the upstream ultrasonic wave may be measured/calculated. It is to be appreciated that steps 320 and 322 may also be performed in the reverse order without affecting any later processing and calculations. Once the two transit times have been determined, the speed of propagation of the ultrasonic waves in the fluid may be determined (for example, using equation (3) above) in step 324. According to one embodiment it is computationally convenient to simply maintain a record of $\Delta t_u + \Delta t_d$ which is directly indicative of speed of propagation of the ultrasonic waves in the fluid and also directly used in equations (10) through (12) above. This procedure may be periodically repeated, as indicated by line 326, to maintain an accurate record of the speed of propagation of the ultrasonic waves in the fluid, which may be affected by parameters such as the temperature of the system. Thus, it may be desirable to update the measurement periodically, or if parameters of the system environment, such as temperature, change. In a next step 328 the transit time difference $\Delta t$ may be calculated (methods for which are discussed below) and then the flow rate of the fluid in the system may be calculated in step 330 based upon equation (9) or equation (12) given above. The determination of the flow rate may be periodically repeated, as indicated by line 332, to nearly continuously measure the velocity of the fluid and accurately detect any changes therein. In general, as the flow rate of the fluid may be expected to change more frequently over time than the speed of propagation of the ultrasonic waves in the fluid, steps 328–330 may be repeated more frequently than steps 320–324, although the present invention is not so limited.

Figure 6:
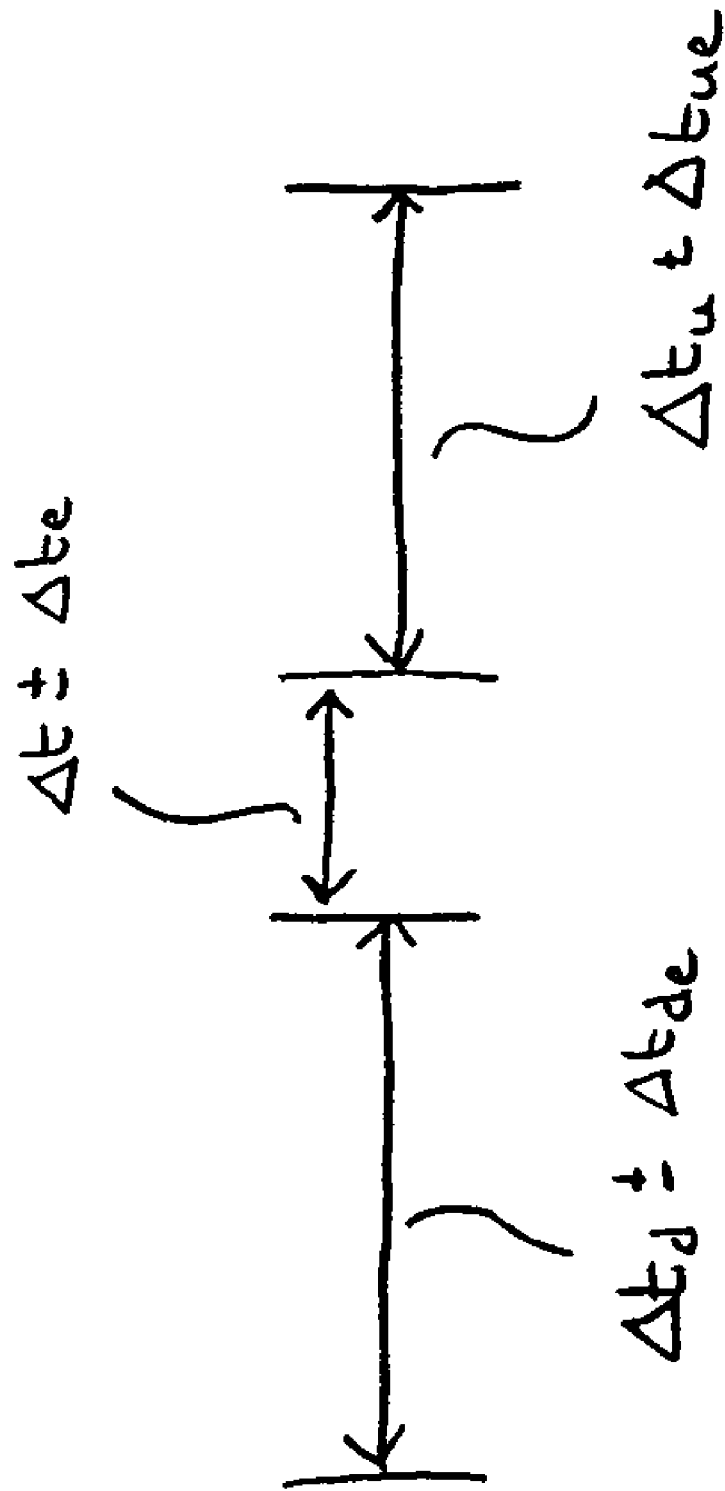
FIG. 6 is a diagram illustrating relative measurement error.

According to one embodiment, the flow rate may be proportional to $\Delta t$ and it may therefore be unnecessary to measure $\Delta t_u$ and $\Delta t_d$ each time the flow rate is to be determined. In other words, because the system is synchronized such that the transmit times of the upstream and downstream ultrasonic waves are always known, $\Delta t$ may be measured directly, by comparing the times at which the received ultrasonic waves 304 and 308 are received, rather than being derived from measurements of the transit times $\Delta t_u$ and $\Delta t_d$. This may be particularly advantageous for at least two reasons. First, as shown in FIG. 6, measuring $\Delta t$ directly may be more accurate than calculating it from measurements of $\Delta t_u$ and $\Delta t_d$. This is because, in measuring $\Delta t$ directly there is only one measurement involved and thus only one degree of error ($\Delta t_e$), or tolerance, associated with it. By contrast, each measurement of $\Delta t_u$ and $\Delta t_d$ has associated with it an error term $\Delta t_{ue}$ and $\Delta t_{de}$, respectively. Thus, at a minimum, calculation of $\Delta t$ from measurements of $\Delta t_u$ and $\Delta t_d$ has two degrees of error associated with it. In addition, because there is only one measurement involved with measuring $\Delta t$ directly, rather than two, this may require less processor time and may be repeated more quickly, thereby enabling a more accurate continuous determination of the flow rate of the fluid because the elapsed time between measurements may be reduced.

According to one embodiment, each of $\Delta t_u$ and $\Delta t_d$ may be determined using one of several mathematical processes. In one example, envelope detection circuitry/methods may be used to detect the received signals 304, 308, as known in the art. For example, a certain point, for example, a beginning or end point, of the received signals may be detected and recorded and a counter may be used to count the time elapsed between the known start time of the sent signal 302, 306, namely relative moment in time N, and the time of reception of the corresponding point in the received signals 304, 308. Averaging techniques, as known in the art, may then be used to improve the accuracy of the time measurement over a series of such measurements. In this manner, $\Delta t_u$ and $\Delta t_d$ may be measured. However, because averaging of many measurements may be needed to obtain a satisfactorily accurate measurement, this method may not be desirable in some circumstances.

Therefore, in another example, rather than detect a single point within the received signal, such as at the beginning or end, the entire signal may be detected, digitized (using A/D 222), and stored in storage element 224. A cross-correlation between the sent signal and the received signal may then be performed in order to determine the transit time $\Delta t_u$ or $\Delta t_d$. It is to be appreciated that although the various processes of cross-correlation and transforms discussed below will be described, for convenience, in terms of the sent and received signals 302, 304, 306 and 308, the actual mathematical procedures may be performed on the digital representations of these signals.

Figure 7A:
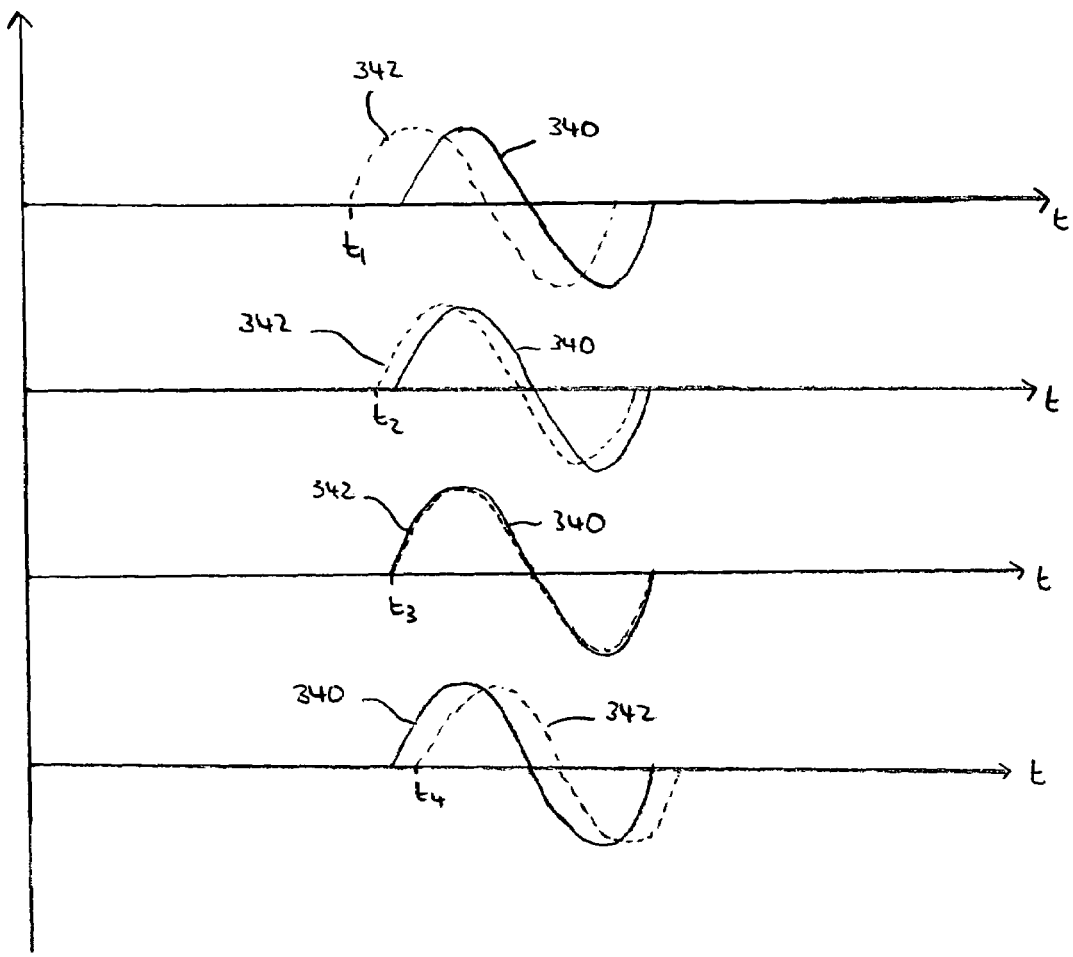
FIG. 7a is a timing diagram illustrating cross-correlation.
Figure 7B:
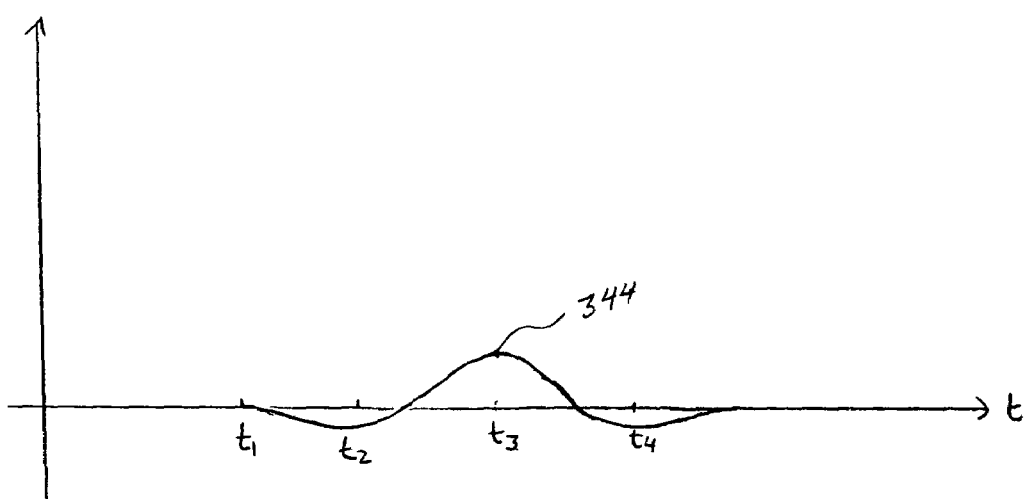
FIG. 7b is a timing diagram illustrating a result of a cross-correlation process of two perfect sinusoids.
Figure 8:
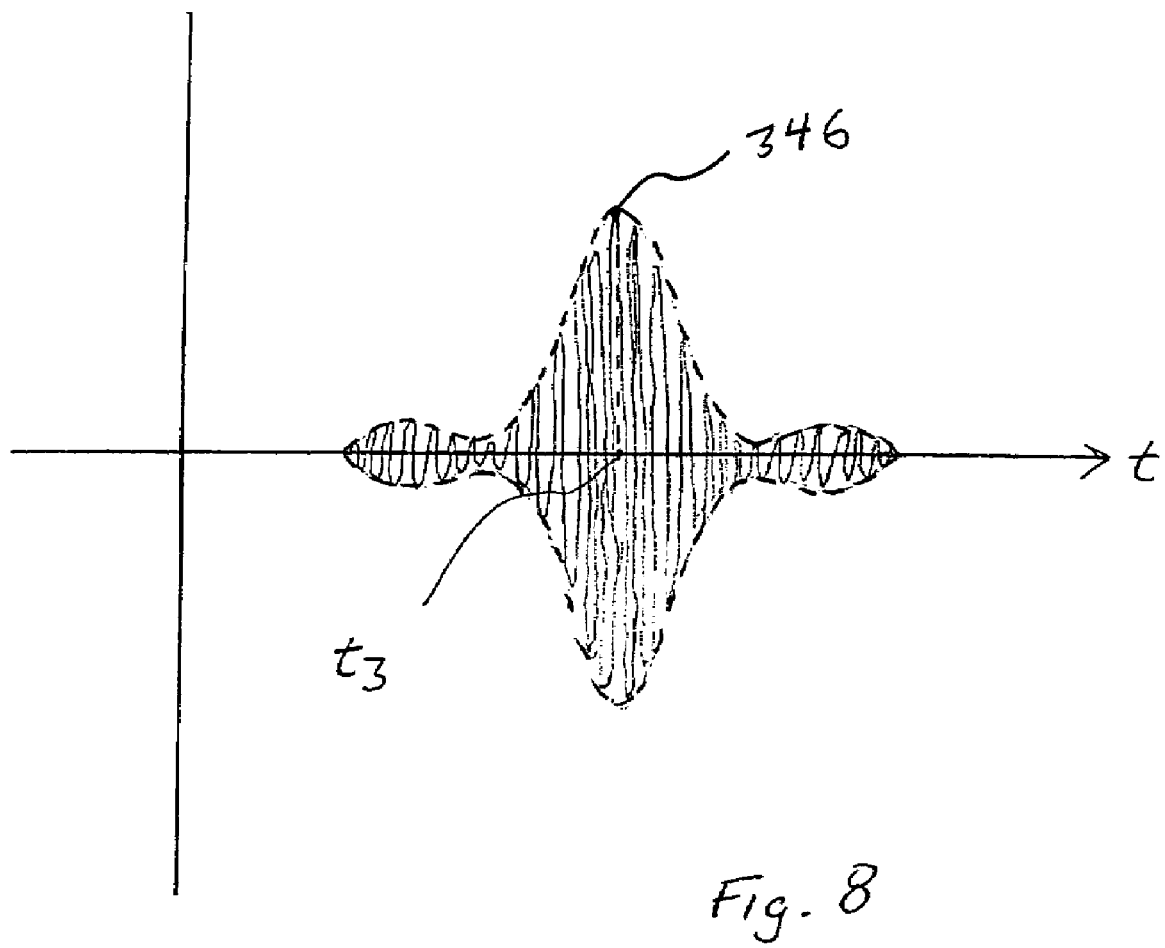
FIG. 8 is a diagram of an example of a result of a cross-correlation process performed on arbitrary signals.

Cross-correlation is a known mathematical process that compares the phases of two signals and produces an output signal that has a magnitude corresponding to the degree of phase matching between the signals. For example, referring to FIGS. 7a and 7b, if a cross-correlation were performed between two perfect single cycle sinusoids, i.e., "moving" one signal 340 across the other 342 in time (FIG. 7a), the result would be a peak 344 at a single point in time, $t_3$, at which the signals are perfectly matched (FIG. 7b). In the current system, because the sent and received signals would not typically be perfect single cycle sinusoids, the result of the correlation is a signal, for example, as shown in FIG. 8, a peak 346 of which corresponds to the time point, $t_3$, when the sent and received signals are most closely phase-matched. Thus, by performing a cross-correlation between the sent ultrasonic wave 302 and the corresponding received ultrasonic wave 304, the transit time $\Delta t_d$ may be determined. Similarly, by performing a cross-correlation between the sent ultrasonic wave 306 and the corresponding received ultrasonic wave 308, the transit time $\Delta t_u$ may be determined. Because each sent and received signal may have a certain bandwidth, B, and a certain time duration, T, performing the correlation between the two signals is equivalent to performing 2n number of single-point measurements as described above, according to the relationship:

$$BT = 2n \tag{13}$$

where n is the equivalent number of single-point measurements required to achieve a same degree of accuracy in the calculation of the transit time. Thus, the correlation technique obtains significantly more accuracy within a specific measurement duration and is therefore more time-efficient than averaging an equivalent number of single-point method measurements.

According to one embodiment, the controller 204 may be programmed with an algorithm or set of instructions for performing a correlation operation on the two pairs, upstream and downstream, of sent and received signals. The sent signals 302, 304 may be any of a variety of signals including, for example, a chirp signal or a signal encoded with a known data stream or with error-correcting codes. In a preferred embodiment, a chirp signal may be used, however, it is to be appreciated that many other signals may be used and may be selected according to a variety of design considerations. In particular, it may be preferable to select a signal that is substantially immune to certain kinds of noise. A chirp signal, as used herein, refers to a signal that alters frequency in a determined fashion over its bandwidth. For example, a chirp may begin at one frequency, $f_1$, and end at another, higher or lower frequency, $f_2$. According to one aspect of the invention, the sent signal may be selected such that its bandwidth corresponds to a bandwidth of the ultrasonic transducers. For example, piezoelectric ultrasonic transducers may have a certain bandwidth and operating frequency range. It may be preferable to select a sent signal that may use as much as possible of the bandwidth and frequency range of the ultrasonic transducers so as to maximize efficiency. In one example, the sent signals 302, 304 were selected to be chirp signals having a bandwidth of 50 kilohertz (kHz) over a frequency range of 440 kHz to 490 kHz and a time duration of 150 microseconds (μs). It is to be appreciated that such a chirp signal is but one example of a sent signal that may be used and the invention is not so limited as other appropriate signals may also be used, as will be appreciated by those skilled in the art. Any signal having characteristics such as good signal-to-noise ratio, or high immunity to noise, may be desirable as such a signal may be easily detected (by the other ultrasonic transducer and the receiver circuit) and provide accurate results from the cross-correlation process.

As known to those of skill in the art, the mathematical process of cross-correlation in the time domain is equivalent to multiplication of the signals in the frequency domain. Therefore, according to one example, the controller may be programmed to perform a cross-correlation between the sent and received signals in the time domain. In another embodiment, the controller 204 may be programmed to perform a transform on the signals, to transform them into frequency domain representations, perform frequency domain multiplication of one of the frequency domain representations by the complex conjugate of the other frequency domain representation in the frequency domain, and re-transform the multiplied result into the time domain, where again a peak in the signal may indicate the time point at which the signals are most closely phase matched and thus corresponds to the transit time $\Delta t_u$ or $\Delta t_d$. For this purpose, the controller 204 may be or may include a digital signal processor.

Figure 9:
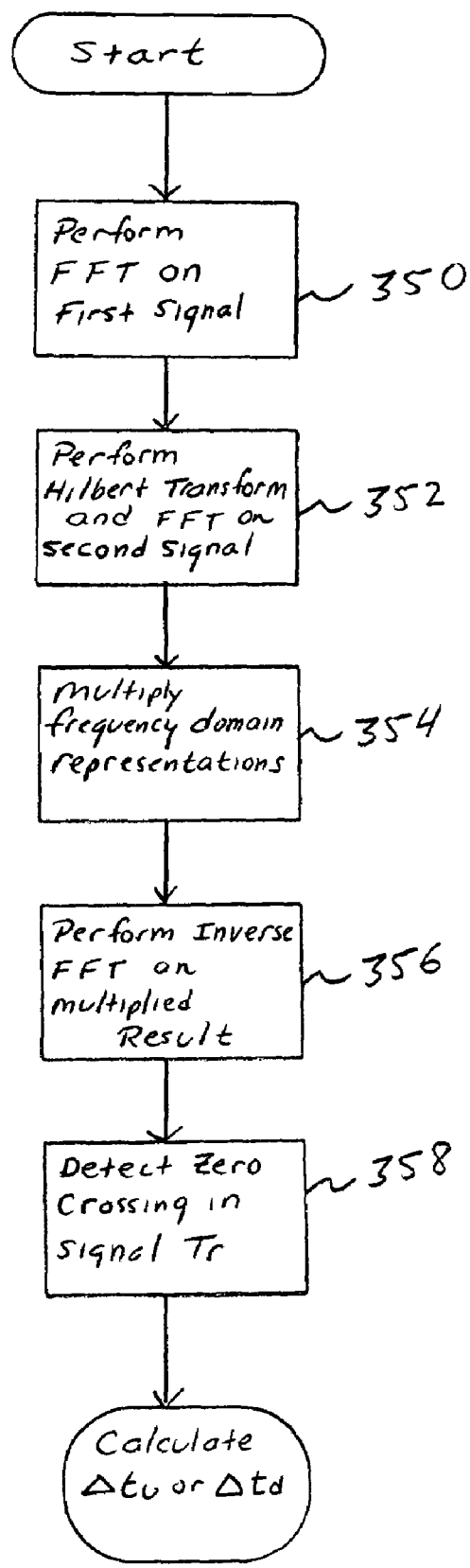
FIG. 9 is a flow diagram of one example of a method for determining the transit times of upstream and downstream of ultrasonic waves.

Referring to FIG. 9, according to one embodiment, the controller 204 may be programmed with an algorithm to perform a fast Fourier transform (FFT) on each of the sent and received signals, for example, sent signal 302 and received signal 304, to transform them into frequency domain representations. An effective Hilbert transform may then be performed on one of the frequency domain representations by adding a 90 degree phase shift to each positive frequency component and a −90 degree phase shift to each negative frequency component and then multiplying the two frequency domain representations as discussed below in step 354. In another example, the controller may be programmed to perform an FFT on the first signal (step 350), for example, sent signal 302, and a Hilbert transform and an FFT on the second signal (step 352), for example, received signal 304. Performing a Hilbert transform on a signal that is a function of time (t) comprises performing a convolution of the signal with the function $-1/\pi t$. When the Hilbert transform of the signal is then examined in the frequency domain, for example, by performing an FFT on the Hubert transform of the signal, it is apparent that there has been a sign-dependent phase shift relative to the original signal; that is, all cosine components are transformed into negative sine components and all sine components are transformed in cosine components. This corresponds to "rotating" the signal in the real and imaginary planes. Accordingly, taking an FFT of each of the sent and received signals and performing an effective Hilbert transform on one of the frequency domain representations is mathematically equivalent to taking the FFT of one of the sent and received signals and performing a Hilbert transform and an FFT on the other of the sent and received signals.

The controller may then perform frequency domain multiplication of one frequency domain representation by the complex conjugate of the other frequency domain representation (i.e., multiply the two frequency domain representations in the frequency domain (step 354)), and perform an inverse FFT on the multiplied result (step 356) to transform it back into the time domain. The processed time domain signal is referred to as signal $T_r$ for clarity. As a result of the Hilbert transform performed on one signal, instead of a peak in the signal $T_r$ corresponding to the point in time at which the sent signal 302 and received signal 304 are most closely phase-matched, this point in time is now indicated by a zero crossing in the signal $T_r$. In one example, the time point corresponding to $\Delta t_u$ or $\Delta t_d$ may be indicated by a zero crossing in signal $T_r$ that is flanked, on either side, by a largest positive peak and a largest negative peak in the signal $T_r$. Thus, in a step 358, the controller may use any of a variety of known techniques to locate the zero crossing in signal $T_r$, and thus to determine the transit time $\Delta t_u$ or $\Delta t_d$. It should be appreciated that although the step of performing an effective Hilbert transform on one of the frequency domain representations was described as adding a 90 degree phase shift to each positive frequency component and a −90 degree phase shift to each negative frequency component, similar results may alternatively be obtained by adding a −90 phase shift to each positive frequency component and a 90 degree phase shift to each negative frequency component, and then multiplying the two frequency domain representations and performing an inverse FFT on the multiplied result.

It is to be appreciated that although the above algorithm was described in terms of sent signal 302 and received signal 304, the algorithm may also be used on sent signal 306 and received signal 308. In addition, the Hilbert transform may be performed on either the sent or received signal or on the cross-correlation of the sent and received signals. Once both the transit times $\Delta t_u$ and $\Delta t_d$ have been determined, the speed of propagation of the ultrasonic waves in the fluid may be determined according to equation (3) above. It should also be appreciated that in order to locate the zero crossing in step 358, the DC and Nyquist-rate terms of the multiplied result obtained in step 354 should be nearly zero prior to performing the inverse FFT in step 356. This may be performed by ensuring that the multiplied result have essentially no appreciable DC offset and no frequencies near one half the sampling rate, or alternatively, those DC and Nyquist-rate terms of the multiplied frequency domain representation may be set to zero prior to performing the inverse FFT in step 356.

Referring again to FIG. 5, once the speed of propagation of the ultrasonic waves in the fluid has been determined, the controller may implement an algorithm or set of instructions to determine $\Delta t$, the difference in transit times between the upstream ultrasonic wave and the downstream ultrasonic wave without first determining or re-measuring either of $\Delta t_u$ and $\Delta t_d$. Thus, as shown in FIG. 5, $\Delta t$ may be periodically calculated and be used, along with c, the speed of propagation of the waves in the fluid, to determine the flow rate of the fluid. This sequence of steps, 328 and 330 may be repeated, as shown by line 332, as often as desired to accurately monitor the flow rate of the fluid. Every so often, for example, less often than the steps 328 and 330 are performed, steps 320, 322 and 324 may be repeated, as shown by line 326, to update the measurement of the speed of propagation of the ultrasonic waves in the fluid. Although the speed of propagation of the ultrasonic waves in the fluid may likely not vary over short time intervals, such as the time interval required to measure $\Delta t$ and determine the rate of flow of the fluid, the speed of propagation of the ultrasonic waves in the fluid may vary over longer time periods, for example, with temperature variations in the system. Therefore, it may be desirable to update the measurement of the speed of the ultrasonic waves in the fluid periodically or in response to a detected change in the system environment in order to account for longer-term variations in the speed of propagation and maintain accuracy of the calculation of the flow rate of the fluid.

According to one embodiment, the controller may implement an algorithm similar to that described with reference to determining $\Delta t_u$ and $\Delta t_d$ in order to determine $\Delta t$. For example, the controller may be programmed with an algorithm to perform a cross-correlation between received signal 304 and received signal 308. The result of the cross-correlation may be a signal having a peak that corresponds to a time point at which the two received signals are most closely phase matched and that therefore corresponds to the time difference $\Delta t$. In other words, a cross-correlation of the two received signals may yield a time value that indicates by how much the downstream (faster) received signal needs to be shifted in time such that it appears to arrive at the same time as does the upstream received signal. Thus, this "time shift" indicates the time difference $\Delta t$ between the transit times of the upstream and downstream ultrasonic waves between the two ultrasonic transducers without any need to recalculate either of $\Delta t_u$ and $\Delta t_d$.

Figure 10:
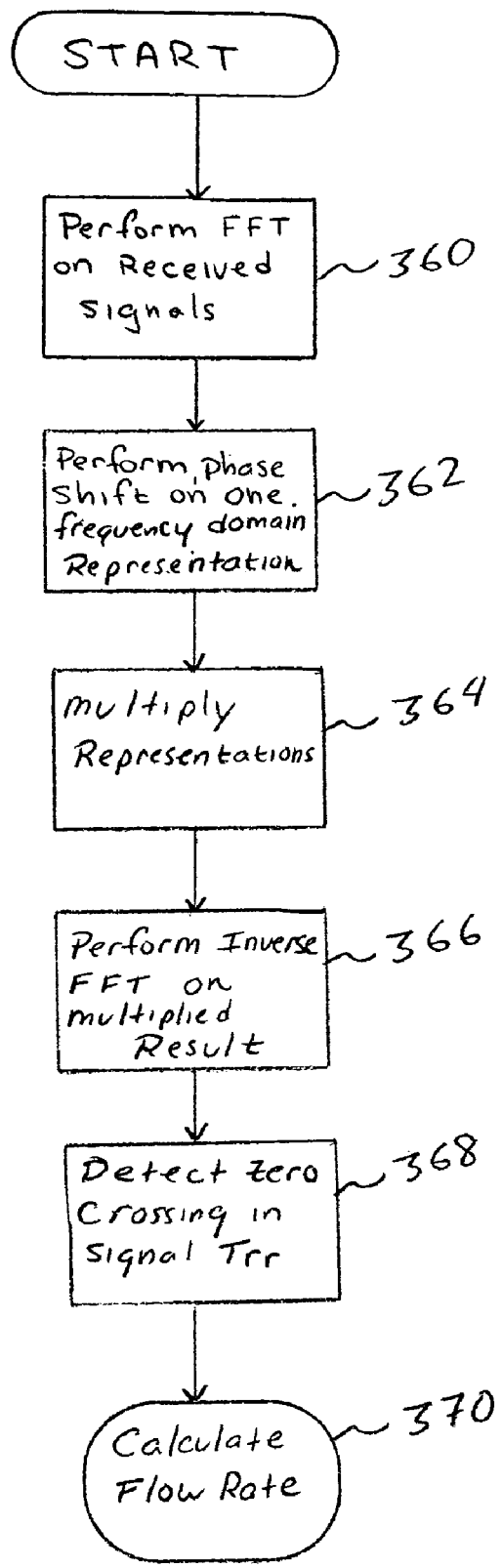
FIG. 10 is a flow diagram of one example of a method for determining the flow rate of a fluid in a conduit.

As discussed above, in one example, the controller 204 may implement a time domain cross-correlation between the two received signals. In another example, the controller may implement transforms, such as an FFT, to transform the two signals into frequency domain representations where the frequency domain representations may be multiplied (e.g., by multiplying one frequency domain representation by the complex conjugate of the other frequency domain representation), rather than correlated, to achieve the same, or similar, result. Referring to FIG. 10, there is illustrated a flow diagram of one example, of a method for determining the flow rate of the fluid. In step 360, a FFT may be performed on each of the received signals 304 and 308 to transform them into frequency domain representations. In a next step 362, a positive 90 degree phase shift may be added to each positive frequency component and a −90 degree phase shift added to each negative frequency component of one of the frequency domain representations, such that the combination of the FFT and phase shift results in an effective Hilbert transform and FFT being performed on one signal. The phase shift may be performed on either frequency domain representation, or alternatively, rather than an FFT being performed on each received signal 304, 308 in step 360, an FFT may be performed on one of the received signals, and a Hilbert transform and FFT may be performed on the other received signal. Next, the two frequency domain representations may be multiplied together (e.g., by multiplying one frequency domain representation by the complex conjugate of the other frequency domain representation) in the frequency domain (step 364), and the multiplied result transformed back into the time domain using, for example, an inverse FFT (step 366). To determine $\Delta t$ (step 368), the controller may implement any known technique to locate a zero crossing in the resulting time domain signal (referred to for clarity as $T_\pi$), as discussed above. The flow rate of the fluid may then be determined based upon equation (9) or equation (12) given above (step 370).

It is to be appreciated that although the above algorithms and mathematical operations were discussed, for clarity, in terms of the sent and received ultrasonic waves, the operations are actually performed on the digital representations of these signals. Therefore, discrete FFTs and Hilbert transforms may be used and multiplication of one frequency domain representation with the complex conjugate of the other may be performed as a point-by-point multiplication of the digital values. It is further to be appreciated that the above described methods may be independent of the fluid flowing in the system and may be used to calculate fluid velocity for a variety of different fluids including, but not limited to, water, slurries, chemical mixtures, and the like, without any a priori knowledge of the fluid and without fluid-specific system calibration. Indeed, a priori knowledge of properties of the ultrasonic waves, such as the speed of propagation of the waves in the fluid (whatever that fluid may be) are not necessary to calculate the velocity of the fluid, as the speed of propagation of the ultrasonic waves in the fluid may be periodically measured in use. The rate of flow of the fluid may then be calculated based upon equation (9) or equation (12) given above, using the velocity of the fluid and known physical parameters of the system and/or fluid.

Alternatively, where the speed of propagation of the ultrasonic waves of the fluid is known in advance, for example, based upon measured test data with a particular fluid, the rate of flow of the fluid may be calculated based upon equation (9) given above without ever determining either $\Delta t_u$ or $\Delta t_d$. For example, the speed of propagation (c) of the ultrasonic wave in the fluid may simply be obtained from a look-up table that is accessible to the controller. The look-up table may include data indicative of the speed of sound propagation for various fluids, as well as how the speed of propagation for each of the various fluids varies with temperature.

According to one embodiment, averaging techniques or filtering, such as Kalman filtering, may be used to improve accuracy of the measurements. In some instances, the speed of propagation of the ultrasonic waves in the fluid may vary with the temperature of the fluid. Therefore, in another embodiment, a temperature sensor may be incorporated into the system, located, for example, in the conduit 130 (see FIG. 2) to measure the fluid temperature. The controller 204 may utilize information provided by the temperature sensor to periodically adjust the measurements and determinations of the speed of propagation of the ultrasonic waves in the fluid and/or to correct the determined flow rate for any known temperature-dependant variations. For example, referring to FIG. 11, it is known that the flow rate of fluid in a conduit, such as conduit 130, may not be constant over a cross-section of the conduit. Rather, as shown in FIG. 11, the fluid may flow faster in the center of the conduit, as shown by arrows 380, and slower near the edges of the conduit (shown by arrows 382) due to friction between the fluid and conduit which may slow the flow of fluid near the edges of the conduit. Therefore, the upstream and downstream ultrasonic wavefronts may not be symmetrical. In addition, the difference in shape between the upstream and downstream ultrasonic wavefronts may vary with temperature because temperature may affect the flow of the fluid in the conduit. Therefore, the controller may apply a temperature-dependent correction factor to the measurements. This correction factor may also be fluid-specific, thus, the controller may include a database that may include appropriate temperature-dependent correction factors for various fluids.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of determining a rate of flow of a fluid in a conduit, the method comprising acts of:
   sending first and second ultrasonic signals along a length of the conduit using a pair of ring-shaped transducers disposed at first and second positions spaced apart along the length of the conduit;
   receiving the first and second ultrasonic signals;
   cross-correlating the first received ultrasonic signal and the second received ultrasonic signal to generate a resulting time-domain signal;
   analyzing the resulting time-domain signal to determine a difference in transit time between the first received ultrasonic signal and the second received ultrasonic signal;
   calculating the rate of flow of the fluid in the conduit based upon the determined difference; and
   providing the calculated rate to another device for use as the determined rate of flow of fluid in the conduit;
   wherein the act of cross-correlating comprises:
   performing a Fourier transform on the first received ultrasonic signal to generate a first frequency-domain representation;
   performing a Hilbert transform and a Fourier transform on the second received ultrasonic signal to generate a second frequency-domain representation;
   multiplying the first and second frequency-domain representations together to generate a resulting frequency-domain representation; and
   performing an inverse Fourier transform on the resulting frequency-domain representation to generate the resulting time-domain signal.

2. The method as claimed in claim 1, wherein the act of analyzing the resulting time-domain signal comprises locating a zero crossing within the resulting time-domain signal.

3. The method as claimed in claim 2, further comprising an act of setting DC and Nyquist-rate terms of the resulting frequency-domain representation to zero prior to the act of performing the inverse Fourier transform on the resulting frequency-domain representation.

4. The method as claimed in claim 1, further comprising an act of determining a speed of propagation of at least one of the first and second ultrasonic signals in the fluid.

5. The method as claimed in claim 4, wherein the act of calculating the rate of flow of the fluid based upon the determined difference is performed more frequently than the act of determining the speed of propagation.

6. The method as claimed in claim 4, wherein the act of determining the speed of propagation comprises:
   determining a first transit time of the first ultrasonic signal between the first and second positions;
   determining a second transit time of the second ultrasonic signal between the second and first positions; and
   calculating the speed of propagation based upon the first and second transit times and a distance between the first and second positions.

7. The method as claimed in claim 6, further comprising an act of periodically updating the speed of propagation of the at least one of the first and second ultrasonic signals in the fluid by periodically repeating the acts of determining the first and second transit times and the act of calculating the speed of propagation.

8. The method as claimed in claim 7, wherein the act of calculating the rate of flow of the fluid includes an act of calculating the rate of flow based upon the determined difference and the speed of propagation.

9. A method of determining a rate of flow of a fluid in a conduit, the method comprising acts of:
sending first and second ultrasonic signals along a length of the conduit using a pair of ring-shaped transducers disposed at first and second positions spaced apart along the length of the conduit;
receiving the first and second ultrasonic signals;
cross-correlating the first received ultrasonic signal and the second received ultrasonic signal to generate a resulting time-domain signal;
analyzing the resulting time-domain signal to determine a difference in transit time between the first received ultrasonic signal and the second received ultrasonic signal;
calculating the rate of flow of the fluid in the conduit based upon the determined difference; and
providing the calculated rate to another device for use as the determined rate of flow of fluid in the conduit;
wherein the act of cross-correlating comprises:
performing a Fourier transform on each of the received ultrasonic signal and the second received ultrasonic signal to generate a first frequency-domain representation and a second frequency-domain representation, respectively;
multiplying the first and second frequency-domain representations together to generate a resulting frequency-domain representation; and
performing an inverse Fourier transform on the resulting frequency-domain representation to generate the resulting time-domain signal.

10. The method as claimed in claim 9, further comprising acts of:
adding one of a positive 90 degree phase shift and a negative 90 degree phase shift to each positive frequency component of one of the first frequency-domain representation and the second frequency-domain representation; and
adding the other of a positive 90 degree phase shift and a negative 90 degree phase shift to each negative frequency component of the one of the first frequency-domain representation and the second frequency-domain representation.

11. The method as claimed in claim 1, wherein the act of sending the first and second ultrasonic signals includes an act of digitally synthesizing the first and second ultrasonic signals from a digital representation of a chirp signal.

12. An ultrasonic flow meter comprising:
a conduit;
a first ring-shaped ultrasonic transducer, disposed at a first position along a length of the conduit, to transmit a first ultrasonic signal and to receive a second ultrasonic signal;
a second ring-shaped ultrasonic transducer, disposed at a second position along the length of the conduit that is spaced apart from the first position, to transmit the second ultrasonic signal and to receive the first ultrasonic signal; and
a controller configured to cross-correlate the first received ultrasonic signal and the second received ultrasonic signal and generate a resulting time-domain signal, to analyze the resulting time-domain signal to determine a difference in transit time between the first received ultrasonic signal and the second received ultrasonic signal, and to calculate a rate of flow of a fluid in the conduit based upon the determined difference;

wherein the controller is further configured to:
perform a Fourier transform on the first received ultrasonic signal to generate a first frequency-domain representation;
perform a Hilbert transform and a Fourier transform on the second received ultrasonic signal to generate a second frequency-domain representation;
multiply the first and second frequency-domain representations together to generate a resulting frequency-domain representation; and
perform an inverse Fourier transform on the resulting frequency-domain representation to generate the resulting time-domain signal.

13. The ultrasonic flow meter as claimed in claim 12, wherein the controller is further configured to analyze the resulting time-domain signal by locating a zero crossing within the resulting time-domain signal.

14. The ultrasonic flow meter as claimed in claim 13, wherein the controller is further configured to set DC and Nyquist-rate terms of the resulting frequency-domain representation to zero prior to performing the inverse Fourier transform on the resulting frequency-domain representation.

15. The ultrasonic flow meter as claimed in claim 13, wherein the controller is further configured to determine a speed of propagation of the first and second ultrasonic signals in the fluid by determining a first transit time of the first ultrasonic signal between first and second positions, determining a second transit time of the second ultrasonic signal between the second and first positions, and calculating the speed of propagation based upon the first and second transit times and a distance between the first and second positions along the length of the conduit.

16. The ultrasonic flow meter as claimed in claim 15, wherein the controller is configured to calculate the rate of flow of the fluid based upon the determined difference and the speed of propagation.

17. The ultrasonic flow meter as claimed in claim 16, further comprising:
a timing circuit, operatively coupled to the first and second ultrasonic transducers, to initiate transmission of the first and second ultrasonic signals after a determined delay relative to a reference event.

18. The ultrasonic flow meter as claimed in claim 17, further comprising:
a transmitter circuit, responsive to the timing circuit and switchably connected to each of the first and second ultrasonic transducers, to generate the first and second ultrasonic signals and to provide the first and second ultrasonic signals to the first and second ultrasonic transducers for transmission.

19. The ultrasonic flow meter as claimed in claim 18, further comprising:
a receiver circuit, switchably connected to each of the first and second ultrasonic transducers, to receive the first and second ultrasonic signals and to provide the first and second received ultrasonic signals to the controller.

20. The ultrasonic flow meter as claimed in claim 19, wherein the transmitter circuit includes:
a storage circuit to store digital representations of the first ultrasonic signal and the second ultrasonic signal;
a digital to analog converter, electrically coupled to the storage circuit, to convert the digital representations of the first ultrasonic signal and the second ultrasonic signal to analog representations;
a filter, electrically coupled to the digital to analog converter, to filter the analog representations; and an amplifier, electrically coupled to the filter, to amplify the filtered analog representations and to provide the filtered analog representations to the first and second ultrasonic transducers for transmission.

21. The ultrasonic flow meter as claimed in claim 20, wherein each of the first and second ultrasonic signals includes an ultrasonic chirp signal.

22. The ultrasonic flow meter as claimed in claim 15, wherein the controller is configured to calculate the rate of flow of the fluid based upon the determined difference, the speed of propagation, and a cross-sectional area of the conduit.

23. The ultrasonic flow meter as claimed in claim 15, wherein the controller is configured to calculate the rate of flow of the fluid based upon the determined difference, the speed of propagation, a cross-sectional area of the conduit, and a specific density of the fluid in the conduit.

24. The ultrasonic flow meter as claimed in claim 12, further comprising:
    a timing circuit, operatively coupled to the first and second ultrasonic transducers, to initiate transmission of the first and second ultrasonic signals after a first determined delay relative to a reference event.

25. The ultrasonic flow meter as claimed in claim 24, wherein the timing circuit initiates reception of the first and second ultrasonic signals after a second determined delay relative to the reference event.

26. The ultrasonic flow meter as claimed in claim 12, further comprising:
    a transmitter circuit to generate the first and second ultrasonic signals and to provide the first and second ultrasonic signals to the first and second ultrasonic transducers for transmission.

27. The ultrasonic flow meter as claimed in claim 26, further comprising:
    a receiver circuit to receive the first and second ultrasonic signals and to provide the first and second received ultrasonic signals to the controller.

28. The ultrasonic flow meter as claimed in claim 26, wherein the transmitter circuit includes:
    a storage circuit to store digital representations of the first ultrasonic signal and the second ultrasonic signal;
    a digital to analog converter, electrically coupled to the storage circuit, to convert the digital representations of the first ultrasonic signal and the second ultrasonic signal to analog representations; and
    an amplifier, electrically coupled to the digital to analog converter, to amplify the analog representations and to provide the analog representations to the first and second ultrasonic transducers for transmission.

29. The ultrasonic flow meter as claimed in claim 12, wherein each of the first and second ultrasonic signals includes an ultrasonic chirp signal.

30. The ultrasonic flow meter as claimed in claim 29, wherein the ultrasonic chirp signal is digitally synthesized.

* * * * *